US011857963B2

(12) United States Patent
Lee

(10) Patent No.: US 11,857,963 B2
(45) **Date of Patent: *Jan. 2, 2024**

(54) MICROFLUIDIC STRUCTURE, MICROFLUIDIC DEVICE HAVING THE SAME AND METHOD OF CONTROLLING THE MICROFLUIDIC DEVICE

(71) Applicant: NEXUS DX, INC., San Diego, CA (US)

(72) Inventor: Beom Seok Lee, Hwaseong-si (KR)

(73) Assignee: NEXUS DX, INC., San Diego, CA (US)

( * ) Notice: Subject to any disclaimer, the term of this patent is extended or adjusted under 35 U.S.C. 154(b) by 335 days.

This patent is subject to a terminal disclaimer.

(21) Appl. No.: 17/091,692

(22) Filed: Nov. 6, 2020

(65) Prior Publication Data

US 2021/0053054 A1 Feb. 25, 2021

Related U.S. Application Data

(60) Continuation of application No. 16/115,379, filed on Aug. 28, 2018, now Pat. No. 11,110,454, which is a (Continued)

(30) Foreign Application Priority Data

Jul. 11, 2012 (KR) ........................ 10-2012-0075711
Aug. 3, 2012 (KR) ........................ 10-2012-0085361

(51) Int. Cl.
*B01L 3/00* (2006.01)

(52) U.S. Cl.
CPC ..... *B01L 3/50273* (2013.01); *B01L 3/502738* (2013.01); *B01L 3/502753* (2013.01);
(Continued)

(58) Field of Classification Search
CPC .................................................. B01L 3/50273
(Continued)

(56) References Cited

U.S. PATENT DOCUMENTS 3,706,413 A 12/1972 Blum
5,160,702 A 11/1992 Kopf-Sill
(Continued)

FOREIGN PATENT DOCUMENTS

CN 101918528 12/2010
CN 102177439 9/2011
(Continued)

OTHER PUBLICATIONS

Office Action dated Jun. 24, 2020 in U.S. Appl. No. 16/115,379.
(Continued)

*Primary Examiner* — Christine T Mui
*Assistant Examiner* — Emily R. Berkeley
(74) *Attorney, Agent, or Firm* — Knobbe, Martens, Olson & Bear, LLP

(57) ABSTRACT

A microfluidic structure in which a plurality of chambers arranged at different positions are connected in parallel and into which a fixed amount of fluid may be efficiently distributed without using a separate driving source, and a microfluidic device having the same. The microfluidic device includes a platform having a center of rotation and including at least one microfluidic structure. The microfluidic structure includes a sample supply chamber configured to accommodate a sample, a plurality of first chambers arranged in a circumferential direction of the platform at different distances from the center of rotation of the platform, and a plurality of siphon channels, each of the siphon channels being connected to a corresponding one of the first chambers.

20 Claims, 34 Drawing Sheets

Related U.S. Application Data continuation of application No. 14/803,161, filed on Jul. 20, 2015, now Pat. No. 10,058,864, which is a division of application No. 13/934,857, filed on Jul. 3, 2013, now abandoned.

(52) U.S. Cl.
CPC .................. *B01L 2200/0605* (2013.01); *B01L 2200/0621* (2013.01); *B01L 2200/10* (2013.01); *B01L 2200/12* (2013.01); *B01L 2300/0681* (2013.01); *B01L 2300/0803* (2013.01); *B01L 2300/0806* (2013.01); *B01L 2300/087* (2013.01); *B01L 2300/0864* (2013.01); *B01L 2400/043* (2013.01); *B01L 2400/0406* (2013.01); *B01L 2400/0409* (2013.01); *B01L 2400/0487* (2013.01); *B01L 2400/0688* (2013.01); *B01L 2400/082* (2013.01); *B01L 2400/086* (2013.01); *Y10T 436/2575* (2015.01)

(58) Field of Classification Search
USPC .......................................................... 436/180
See application file for complete search history.

(56) References Cited

U.S. PATENT DOCUMENTS

| | | | | |
|---|---|---|---|---|
| 5,976,472 | A | 11/1999 | Chatterjee | |
| 7,125,711 | B2 | 10/2006 | Pugia | |
| 10,058,864 | B2 | 8/2018 | Lee | |
| 11,110,454 | B2 * | 9/2021 | Lee | B01L 3/502738 |
| 2006/0223103 | A1 | 10/2006 | Klapproth | |
| 2007/0128652 | A1 | 6/2007 | Woudenberg | |
| 2010/0081213 | A1 | 4/2010 | Lee | |
| 2010/0093105 | A1 | 4/2010 | Lee | |
| 2010/0288949 | A1 | 11/2010 | Yoo | |
| 2011/0094600 | A1 | 4/2011 | Bergeron | |
| 2011/0111987 | A1 | 5/2011 | Siegreist | |
| 2012/0295781 | A1 | 11/2012 | Amasia | |

FOREIGN PATENT DOCUMENTS

| | | |
|---|---|---|
| EP | 1288648 | 3/2003 |
| GB | 2479139 | 10/2011 |
| WO | WO 2007/006049 | 1/2007 |

OTHER PUBLICATIONS

Communication dated Sep. 14, 2016, issued by the State Intellectual Property Office of the People's Republic of China in counterpart Chinese Application No. 201310291257.2.
Communication dated Mar. 27, 2017, issued by the State Intellectual Property Office of the People's Republic of China in counterpart Chinese Application No. 201310291257.2.
Communication dated Apr. 6, 2017, from the European Patent Office in counterpart European Application No. 13176051.4.
Communication dated Mar. 24, 2017, issued by the Canadian Intellectual Property Office in counterpart Canadian Application No. 2,820,181.
Communication dated Oct. 17, 2017, issued by the State Intellectual Property Office of the PR's China in counterpart Chinese Application No. 201310291257.2.
Communication dated Mar. 8, 2018, issued by the State Intellectual Property Office of the People's Republic of China in counterpart Chinese Application No. 201310291257.2.
Communication dated Mar. 28, 2018, issued by the Canadian Intellectual Property Office in counterpart Canadian Application No. 2,820,181.
Communication dated Dec. 28, 2015, issued by the State Intellectual Property Office of the People's Republic of China in counterpart Chinese Application No. 201310291257.2.
Gorkin et al., "Centrifugal microfluidics for biomedical applications," Lab on a Chip, first published May 28, 2010, 10, 1758-1773.
Communication dated Feb. 11, 2015, from the European Patent Office in counterpart European Application No. 13176051.4.
Focke et al. "Centrifugal Microfluidic System for Primary Amplification and Secondary Real-Time PCR", Lab Chip, 2010, Vo. 10, pp. 3210-3212, accepted Sep. 14, 2010.
Siegrist, J. et al., "Serial Siphon Valving for Centrifugal Microfluidic Platforms", Microfluid Nanofluid, 2010, vol. 9, pp. 55-63, published online Nov. 4, 2009.
International Search Report dated Sep. 16, 2013, issued by the International Searching Authority in counterpart International Application No. PCT/KR2013/006118.
Office Action dated Apr. 12, 2017 in U.S. Appl. No. 14/803,161.
Final Office Action dated Nov. 7, 2017 in U.S. Appl. No. 14/803,161.
Notice of Allowance dated Jun. 7, 2018 in U.S. Appl. No. 14/803,161.
Supplemental Notice of Allowance dated Jun. 27, 2018 in U.S. Appl. No. 14/803,161.
Office Action dated Jun. 24, 2017 in U.S. Appl. No. 16/115,379..

* cited by examiner

MICROFLUIDIC STRUCTURE, MICROFLUIDIC DEVICE HAVING THE SAME AND METHOD OF CONTROLLING THE MICROFLUIDIC DEVICE

CROSS-REFERENCE TO RELATED APPLICATION(S)

This application is a continuation of U.S. patent application Ser. No. 16/115,379, filed Aug. 28, 2018, which is a continuation of U.S. patent application Ser. No. 14/803,161, filed Jul. 20, 2015, now U.S. Pat. No. 10,058,864, which is a division of U.S. application Ser. No. 13/934,857, filed Jul. 3, 2013, which claims priority from Korean Patent Applications No. 10-2012-0075711, filed on Jul. 11, 2012, and No. 10-2012-0085361, filed on Aug. 3, 2012, in the Korean Intellectual Property Office, the disclosure of each of which is incorporated herein by reference in its entirety.

BACKGROUND

1. Field

Apparatuses and methods consistent with exemplary embodiments relate to a microfluidic structure in which a sample is efficiently distributed to a plurality of chambers and distribution speed and supply speed of a fluid are adjustable, and a microfluidic device having the same.

2. Description of the Related Art

Microfluidic devices are used to perform biological or chemical reactions by manipulating small amounts of fluid.

A microfluidic structure provided in a microfluidic device to perform an independent function generally includes a chamber to accommodate a fluid, a channel allowing the fluid to flow therethrough, and a member (e.g., valve) to regulate the flow of the fluid. The microfluidic structure may include various combinations of such structures. A device fabricated by disposing such a microfluidic structure on a chip-shaped substrate to perform multi-step processing and manipulation to conduct a test involving an immune serum reaction or biochemical reaction on a small chip is referred to as a lab-on-a chip.

To transfer a fluid in a microfluidic structure, driving pressure is needed. Capillary pressure or pressure generated by a separate pump may be used as the driving pressure. Recently, a disc type microfluidic device which has a microfluidic structure arranged on a disc-shaped platform to move a fluid using centrifugal force to perform a series of operations has been proposed. This device is referred to as a "Lab CD" or "Lab-on a CD."

In a microfluidic structure, adjusting a fluid such as a sample or reaction solution to a fixed amount and regulating the flow of the fluid through the chambers may be important. To perform such adjustment and regulation, a separate valve may be mounted to a channel. However, a separate driving source may be required to open and/or close the valve in this case.

A siphon channel that does not require such a separate driving source has been proposed to overcome this problem. However, the conventional siphon channel is installed between a sample supply chamber and a distribution channel and is used only for distribution of a sample, and conventional cases have not proposed how to transfer the distributed sample.

SUMMARY

Exemplary embodiments provide a microfluidic structure in which a plurality of chambers are arranged at different positions and connected in parallel, and a fixed amount of fluid may thus be efficiently distributed to the chambers without using a separate driving source by connecting one chamber to another chamber for subsequent operation through a siphon channel, and a microfluidic device having the same.

In accordance with an aspect of an exemplary embodiment, there is provided a microfluidic device including a platform having a center of rotation and including a microfluidic structure, wherein the microfluidic structure includes a plurality of first chambers arranged in a circumferential direction of the platform at different distances from the center of rotation; and a plurality of first siphon channels, each of the plurality of first siphon channels being connected to a corresponding first chamber of the plurality of the first chambers.

The microfluidic structure further includes a sample supply chamber configured to accommodate a sample and including a discharge outlet, and a distribution channel connected to the discharge outlet of the sample supply chamber and to the plurality of first chambers, the distribution channel being configured to distribute the sample in the sample supply chamber to the plurality of first chambers.

The first chambers may be arranged such that each of the plurality of first chambers is arranged further from the center of rotation than an adjacent first chamber of the plurality of first chambers to which the sample flows earlier.

The plurality of first chambers may be arranged such that a first chamber of the plurality of first chambers having a larger sequence number along the distribution channel is more distant from the center of rotation than another first chamber having a smaller sequence number.

The first chambers may be arranged in a direction along the distribution channel such that a first chamber of the plurality of first chambers positioned at a greater distance from the discharge outlet of the sample supply chamber than another first chamber of the plurality of first chambers is more distant from the center of rotation of the platform than the other first chamber.

The plurality of first chambers may be spirally arranged around the center of rotation of the platform.

Each of the plurality of first siphon channels may have a crest point at a position higher than a full fluid level of a corresponding first chamber connected thereto.

Widths of the plurality of first siphon channels may be between about 0.01 mm and about 3 mm, and depths of the plurality of first siphon channels may be between about 0.01 mm and about 3 mm.

The microfluidic structure may further include at least one reaction chamber connected to at least one second chamber of the plurality of second chambers.

The plurality of first chambers, the plurality of second chambers and the reaction chamber may be arranged further from the center of rotation than the sample supply chamber.

At least one of the plurality of second chambers may accommodate a first marker conjugate to specifically bind with an analyte in the sample, wherein the first marker conjugate may be a conjugate of a marker and a capture material to specifically bind with the analyte.

The reaction chamber may include a detection region having the capture material, and the capture material specifically binds with the analyte immobilized thereon.

The detection region may be formed by one selected from the group consisting of a porous membrane, a micropore and a micro-pillar to move the sample according to capillary force.

The microfluidic structure may further include a magnetic body disposed in a chamber disposed at a position adjacent to the reaction chamber.

In accordance with an aspect of another exemplary embodiment, there is provided a microfluidic structure formed on a platform, the microfluidic structure including a sample supply chamber configured to accommodate a sample and including a discharge outlet, a distribution channel connected to the discharge outlet of the sample supply chamber, a plurality of first chambers connected to the distribution channel, configured to receive the sample supplied through the distribution channel, and respectively arranged at different radii from a center of rotation of the platform, and a plurality of siphon channels, each of the plurality of siphon channels being connected to a corresponding first chamber of the plurality of first chambers.

The plurality of first chambers may be arranged at an increasing order of the radii from the center of rotation which may correspond to a sequence of supply of the sample to the plurality of first chambers.

The plurality of first chambers may be arranged at an increasing order of the radii from the center of rotation which may correspond to a sequence of flow of the sample through the distribution channel.

The plurality of first chambers may be arranged at an increasing order of the radii from the center of rotation which may correspond to a sequence of supply of the sample.

The plurality of first chambers may be arranged at an increasing order of the radii from the center of rotation which may correspond to an increasing order of distances of the first chambers from the discharge outlet of the sample supply chamber along the distribution channel.

Each of the plurality of siphon channels may have a crest point at a position higher than a full fluid level of the corresponding first chamber connected thereto.

Widths of the plurality of siphon channels may be between about 0.01 mm and about 3 mm, and depths of the plurality of siphon channels may be between about 0.01 mm and about 3 mm.

The microfluidic structure may further include at least one reaction chamber connected to at least one of the plurality of second chambers.

The plurality of first chambers, the plurality of second chambers and the reaction chamber may be arranged further from a center of rotation than the sample supply chamber.

Disposed in at least one of the second chambers may be a first marker conjugate, wherein the first marker conjugate specifically binds to an analyte in the sample.

The reaction chamber may include a detection region having a capture material to specifically bind with the analyte immobilized thereon.

The detection region may be formed by one selected from the group consisting of a porous membrane, a micropore and a micro-pillar to move the sample according to capillary force.

The microfluidic structure may further include a magnetic body disposed in a chamber disposed at a position adjacent to the reaction chamber.

The microfluidic structure may further include a metering chamber disposed between the at least one second chamber and the at least one reaction chamber and configured to meter an amount of a fluid transferred from the at least one second chamber, and a fluid transfer assist unit connected between the metering chamber and the at least one reaction chamber.

The fluid transfer assist unit may include a fluid passage configured to transfer the fluid accommodated in the metering chamber to into the reaction chamber.

The fluid transfer assist unit may further include a fluid guide configured to guide movement of the fluid accommodated in the metering chamber to the fluid passage.

The microfluidic structure may further include a second siphon channel having one end connected to the metering chamber, and a waste chamber connected to the other end of the second siphon channel.

After the fluid accommodated in the metering chamber is transferred to the reaction chamber, the second siphon channel may transfer the fluid sample flowing thereinto to the waste chamber.

The microfluidic structure may further include a magnetic body accommodated in a chamber.

In accordance with another aspect, a test device is provided. The test device includes the microfluidic device, a rotary drive unit configured to rotate a platform of the microfluidic device, a magnetic module configured to be movable in a radial direction of the platform; and a controller configured to control the rotary drive unit and the magnetic module.

When a fluid is to be transferred from the metering chamber to the reaction chamber, the controller is configured to rotate the platform and at a predefined time during rotation of the platform, move the magnetic module to a position over or under the platform such that the magnetic module faces the magnetic body.

In accordance with an aspect of another exemplary embodiment, there is provided a method of controlling a microfluidic device including a platform provided with a second chamber configured to accommodate a fluid, a third chamber configured to meter the amount of the fluid, a fourth chamber configured to have a chromatographic reaction to occur therein using the fluid metered in the third chamber and introduced thereinto, and a channel to connect the second chamber, the third chamber and the fourth chamber to each other, the method including rotating the platform and transferring the fluid accommodated in the second chamber to the third chamber, and repeating intervals comprising increasing a rotational speed of the platform and stopping thereof, such that the fluid flows into the fourth chamber.

The method may further include, upon transferring the fluid to the third chamber, stopping the platform such that a first order reaction occurs between the fluid and a marker conjugate accommodated in the third chamber.

The method may further include, upon introduction of the fluid into the fourth chamber, stopping the platform.

The method may further include, when the platform is stopped, absorbing the fluid a detection region provided in the fourth chamber, and transferring the fluid remaining in the third chamber to the fourth chamber.

The method may further include, allowing a chromatographic reaction to occur in the fourth chamber, and thereafter, rotating the platform to remove the fluid remaining in the fourth chamber.

BRIEF DESCRIPTION OF THE DRAWINGS

The above and/or other aspects will become apparent and more readily appreciated from the following description of exemplary embodiments, taken in conjunction with the accompanying drawings of which.

DETAILED DESCRIPTION

Figure 1:
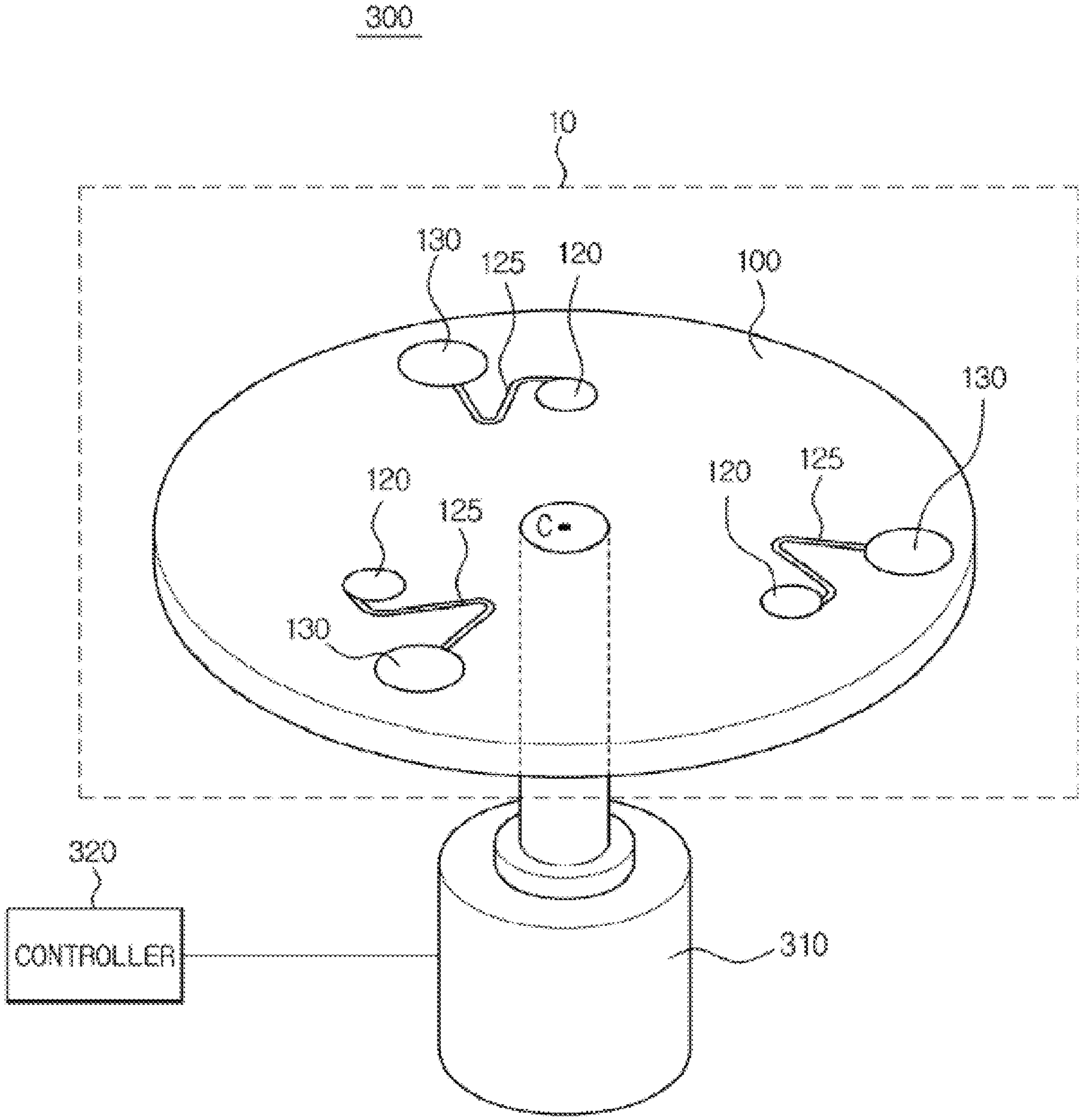
FIG. 1 is a perspective view schematically illustrating a structure of a microfluidic device according to an exemplary embodiment.

Reference will now be made in detail to exemplary embodiments, examples of which are illustrated in the accompanying drawings, wherein like reference numerals refer to like elements throughout.

FIG. 1 is a perspective view schematically illustrating a microfluidic device according to an exemplary embodiment, and a structure of a test system including the same.

Referring to FIG. 1, the microfluidic device 10 according to the illustrated embodiment includes a platform 100 on which one or more microfluidic structures are formed, and a microfluidic structure formed thereon.

The microfluidic structure includes a plurality of chambers to accommodate a fluid and a channel to connect the chambers.

Here, the microfluidic structure is not limited to a structure with a specific shape, but comprehensively refers to structures including channels connecting the chambers to each other and formed on or within the microfluidic device, especially on the platform of the microfluidic device to allow the flow of a fluid. The microfluidic structure may perform different functions depending on the arrangements of the chambers and the channels, and the kind of the fluid accommodated in the chambers or flowing along the channels.

The platform 100 may be made of various materials including plastics such as polymethylmethacrylate (PMMA), polydimethylsiloxane (PDMS), polycarbonate (PC), polypropylene, polyvinyl alcohol and polyethylene, glass, mica, silica and silicon (in the form of a wafer), which are easy to work with and whose surfaces are biologically inactive. The above materials are simply examples of materials usable for the platform 100, and the exemplary embodiments disclosed herein are not limited thereto. Thus, any material having proper chemical and biological stability, optical transparency and mechanical workability may be used as a material of the platform 100.

The platform 100 may be formed in multiple layers of plates. A space to accommodate a fluid within the platform 100 and a channel allowing the fluid to flow therethrough may be provided by forming intaglio structures corresponding to the microfluidic structures, such as the chambers and the channels, on the contact surfaces of two plates, and thereafter, joining the plates. The joining of two plates may be accomplished using any of various techniques such as bonding with an adhesive agent or a double-sided adhesive tape, ultrasonic welding, and laser welding.

The illustrated exemplary embodiment of FIG. 1 employs a circular plate-shaped disc type platform 100, but the platform 100 used in the illustrated embodiment may have the shape of a whole circular plate which is rotatable, may be a circular sector that is rotatable in a rotatable frame when seated thereon, or it may have any polygonal shape provided that it is rotatable by power supplied from a drive unit 310.

The microfluidic device 10 may be mounted to a test device 300 including a drive unit 310 and a controller 320, and may be rotated by the drive unit 310 as shown in FIG. 1. The controller 320 may control actuation of the drive unit 310.

More specifically, the drive unit 310 includes a motor to provide rotational force to the platform 100, thereby enabling fluids accommodated in chambers disposed in the platform 100 to move to other chambers according to centrifugal force. Rotation of the platform 100 through the drive unit 310, as well as overall operations of the test device 300 including positioning a magnet and detecting by a detection unit, which will be described later, may be controlled by the controller 320.

A platform 100 may be provided with one test unit. However, for faster throughput at lower cost, the platform 100 may be divided into a plurality of sections, and each section may be provided with independently operable microfluidic structures. The microfluidic structures may perform different tests and/or may perform several tests at the same time. Alternatively, a plurality of test units that perform the same test may be provided. For convenience of description of the illustrated exemplary embodiment, a description will be given of a case in which a chamber to receive a sample from a sample supply chamber and a channel connected to the chamber form a single unit, and different units may receive the sample from different sample supply chambers.

Since the microfluidic device 10 according to the illustrated embodiment causes a fluid to move using centrifugal force, the chamber 130 to receive the fluid is disposed at a position more distant from the center C of the platform 100 than the position of the chamber 120 to supply the fluid, as shown in FIG. 1.

The two chambers are connected by a channel 125, and in the microfluidic device 10 of the illustrated embodiment, a siphon channel may be used as the channel 125 to control the fluid flowing therethrough.

Figure 2:
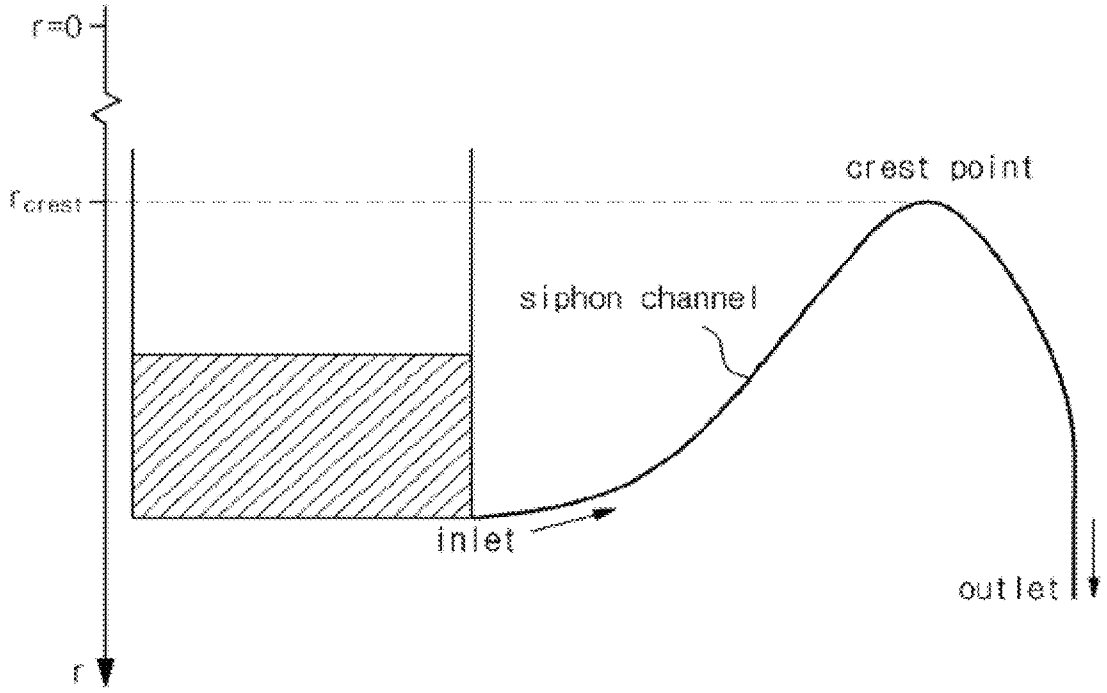
FIG. 2 is a graph illustrating a basic principle of a siphon channel.

FIG. 2 is a graph illustrating a basic principle of a siphon channel.

As used herein, the term "siphon" refers to a channel that causes a fluid to move using a pressure difference. In the microfluidic device 10, the flow of the fluid through the siphon channel is controlled using capillary pressure that forces the fluid to move up through a tube having a very small cross-sectional area and centrifugal force generated by rotation of the platform 100.

The graph of FIG. 2 corresponds to the platform 100 as viewed from the top. The inlet of the siphon channel, which has a very small cross-sectional area is connected to a chamber in which the fluid is accommodated, and the outlet of the siphon channel is connected to another chamber to which the fluid is transferred. As shown, a point at which the siphon channel is bent, i.e., the highest point ($r_{crest}$) of the siphon channel should be higher than the level of the fluid accommodated in the chamber. In addition, since the fluid positioned closer to the outer edge of the platform 100 than the inlet of the siphon channel is not transferred, the positioning of the inlet of the siphon channel will depend on the amount of the fluid to be transferred. When the siphon channel is filled with the fluid by capillary pressure of the siphon channel, the fluid filling the siphon channel is transferred to the next chamber by centrifugal force.

Figure 3:
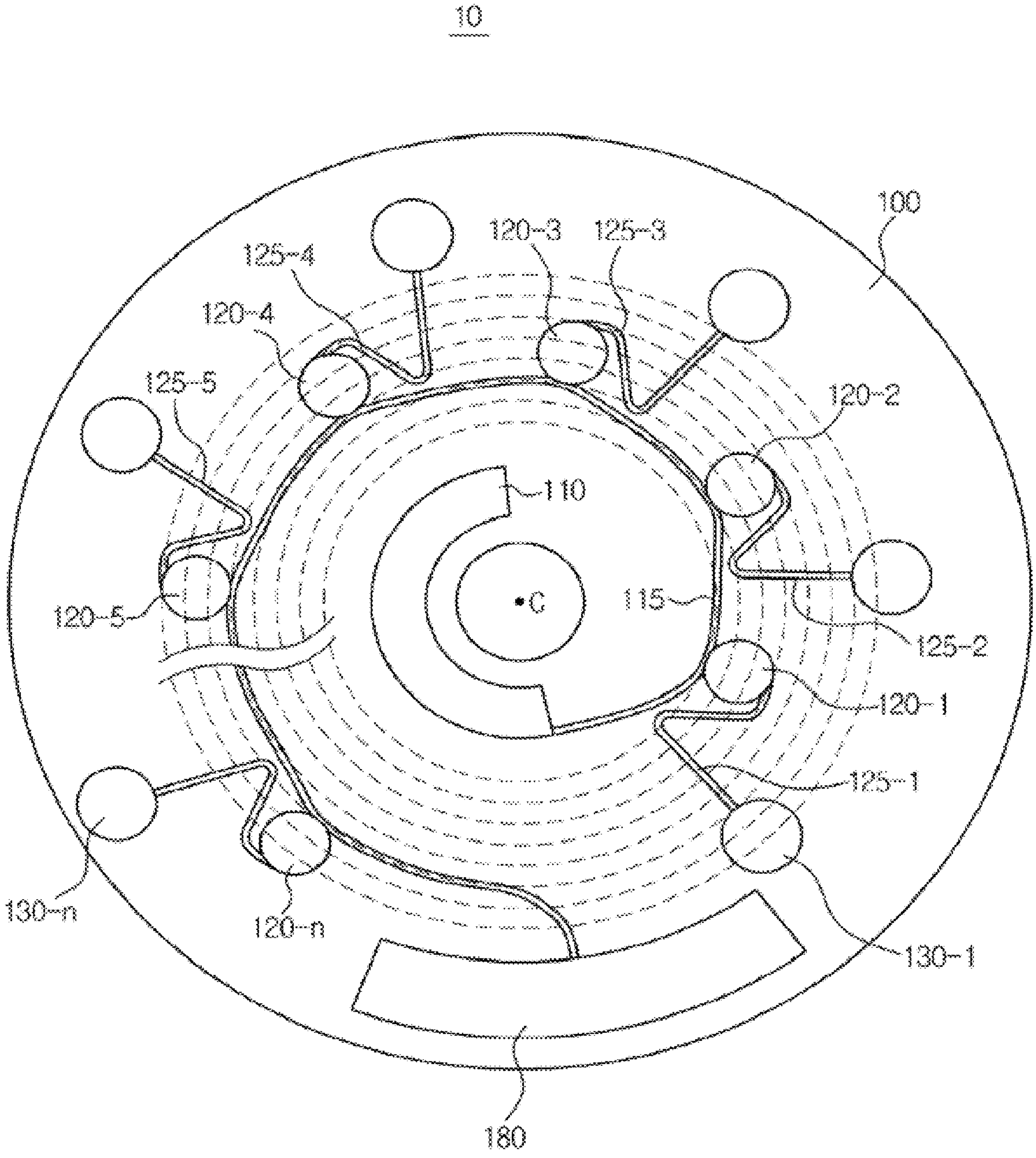
FIG. 3 is a plan view schematically illustrating a microfluidic structure to which siphon channels are applied and a basic structure of a microfluidic device having the same according to the exemplary embodiment.

FIG. 3 is a plan view schematically illustrating a microfluidic structure to which siphon channels are applied and a basic structure of a microfluidic device having the same, according to the exemplary embodiment. Hereinafter, the embodiment will be described assuming that the upper and lower plates of the microfluidic device are not coupled to each other in order to expose the microfluidic structure.

Referring to FIG. 3, the sample supply chamber 110 is formed at a position close to the center of rotation C, and a plurality of chambers is arranged in parallel on a circumference of a circle the center of which coincides with the center of rotation C of the platform 100.

In the illustrated embodiment as described below, the chambers to receive a fluid sample from the sample supply chamber 110 are referred to as first chambers 120, and the chambers to which the fluid sample is transferred from the first chambers are referred to as second chambers 130. In addition, according to the sample supply sequence, the first chambers 120 are respectively referred to as a "1-1"-th 120-1 to a "1-n"-th chamber **120-*n*. The second chambers 130 are respectively referred to as a "2-1"-th chamber 130-1 to a "2-n"-th chamber 130-*n* according to the first chambers connected thereto. The other chambers subsequently connected are defined in the same manner. Also, for convenience of description, when the term "first chambers 120" is used throughout, it means at least one of the first chambers 120-1 to 120-*n*. This is also applied to the other structures ranging from the second chambers 130 to the fifth chambers 170 (see FIG. 7**).

The "1-1"-th chamber 120-1 to the "1-n"-th chamber **120-*n*, which are the first chambers 120, are connected to the sample supply chamber 110 through the distribution channel 115, and are respectively connected to the "2-1"-th chamber 130-1 to the "2-n"-th chamber 130-*n*, which are the second chambers 120, through the siphon channel 125**.

As shown in FIG. 3, the first chambers 120-1 to **120-*n* are arranged about a circumference of the platform 100, but they are not arranged at the same circumference. That is, each of the first chambers has a different distance from the center of rotation C of the platform 100**.

Specifically, the "1-1"-th chamber 120-1 that first receives the sample from the sample supply chamber 110 is disposed on a circumference closest to the center of the platform 100, i.e., the circumference having the shortest radial distance from the center of rotation C of the platform 100, and the "1-2"-th chamber 120-2 is disposed on a circumference more distant from the center of rotation C of the platform 100 than the "1-1"-th chamber 120-1, i.e., on a circumference having a larger radial distance from the center of rotation.

Figure 5A:
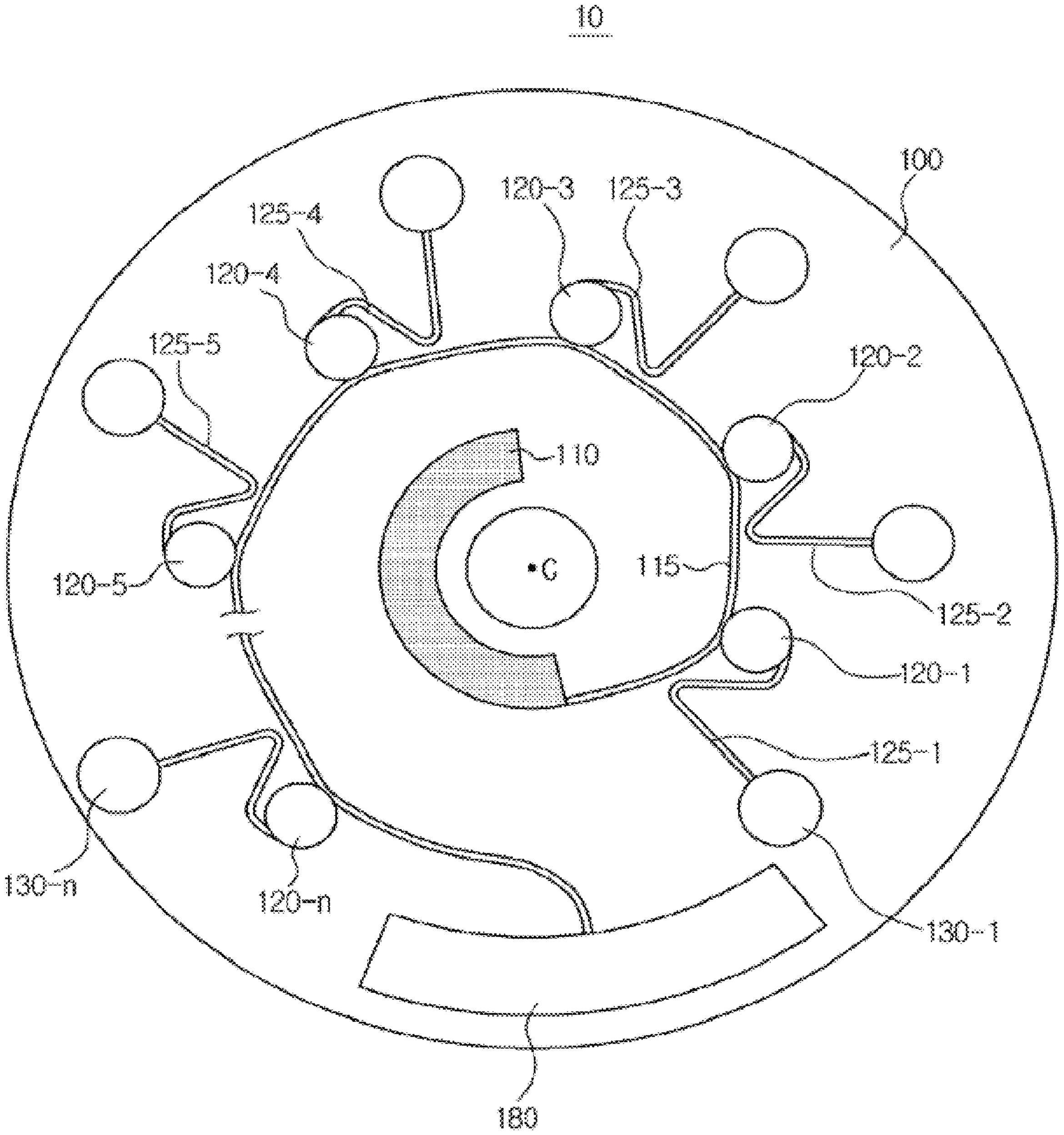
FIGS. 5A to 5D are plan views schematically illustrating flow of a fluid in the microfluidic device according to an exemplary embodiment.
Figure 5B:
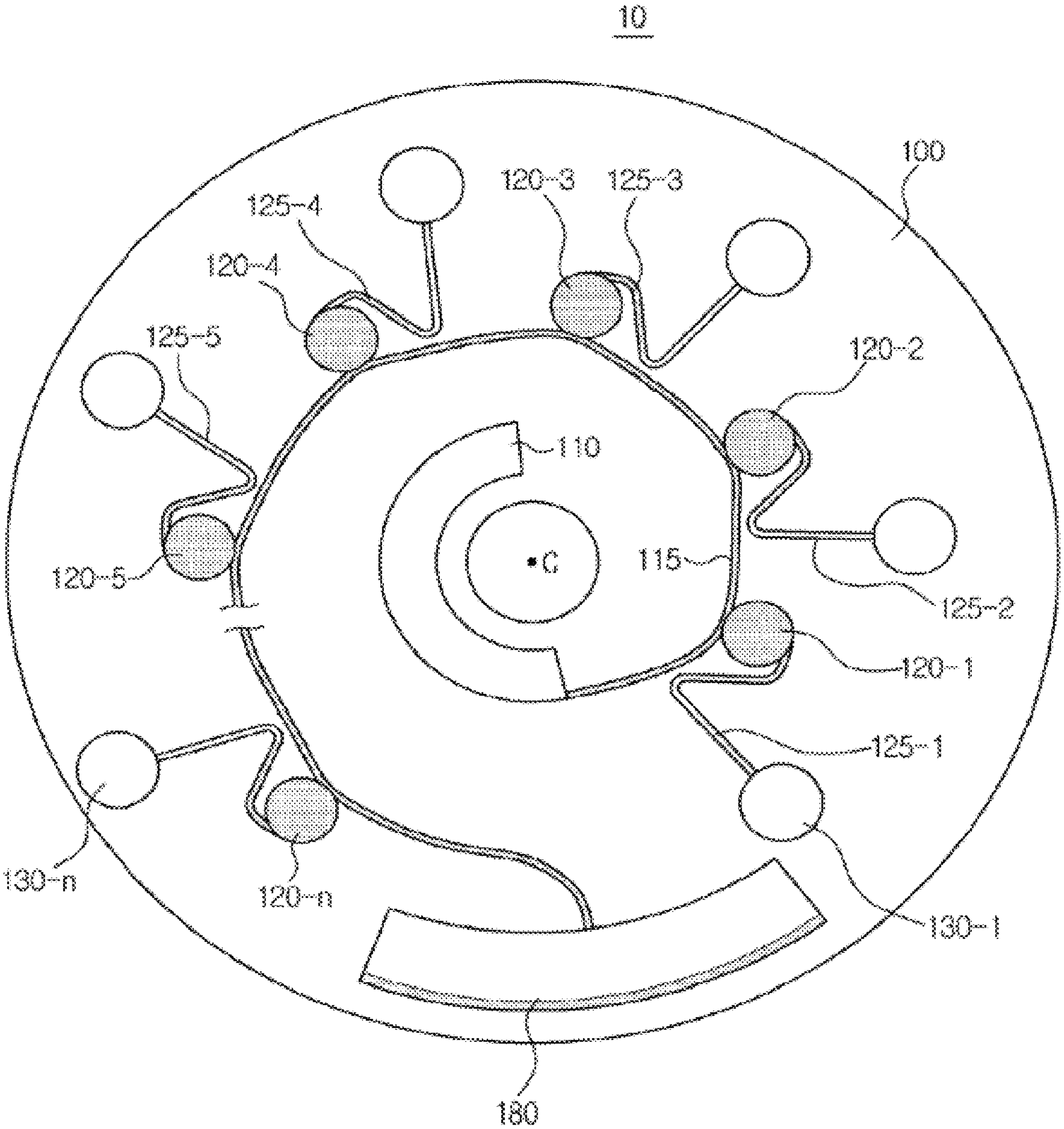
Figure 5C:
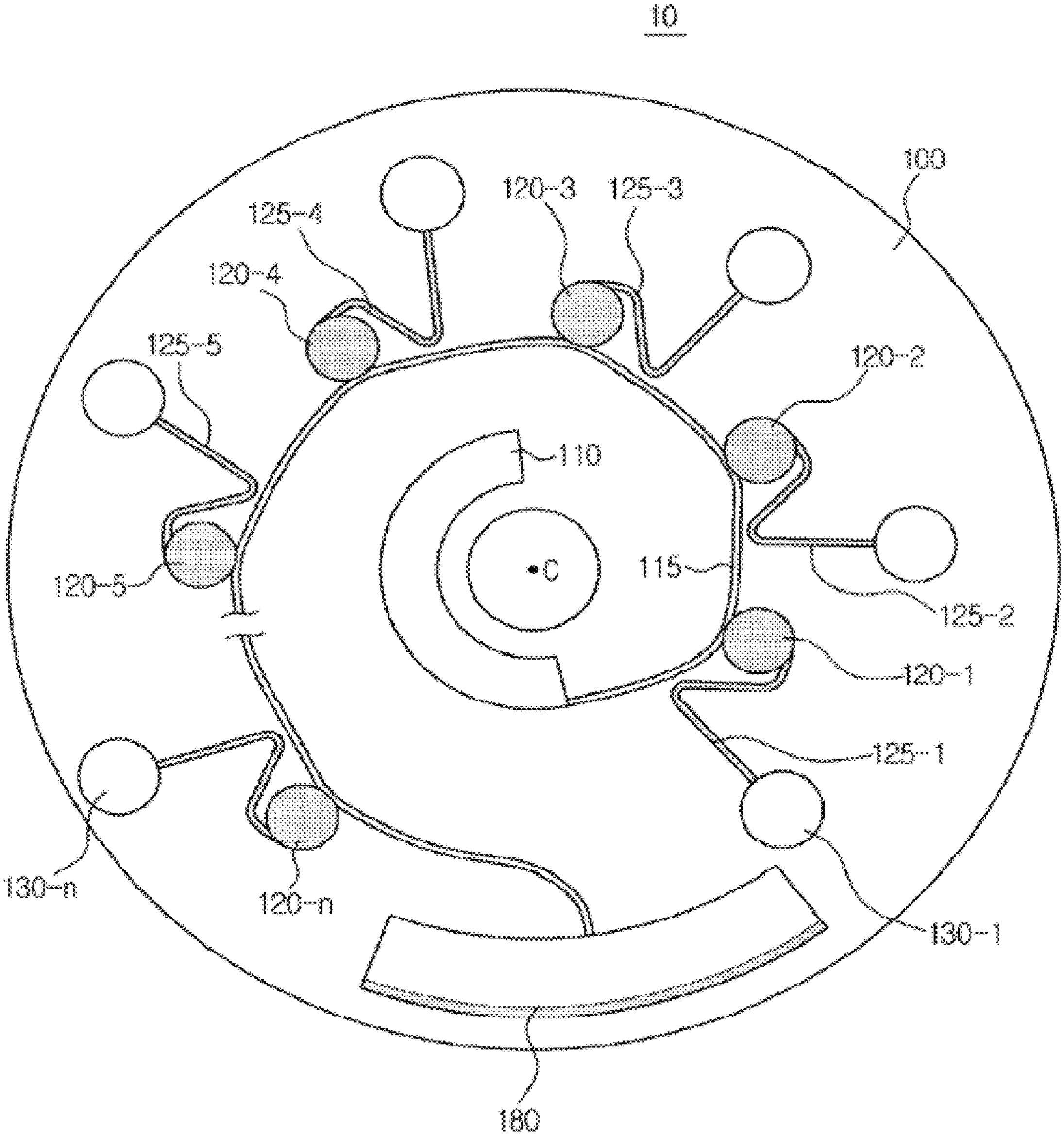
Figure 5D:
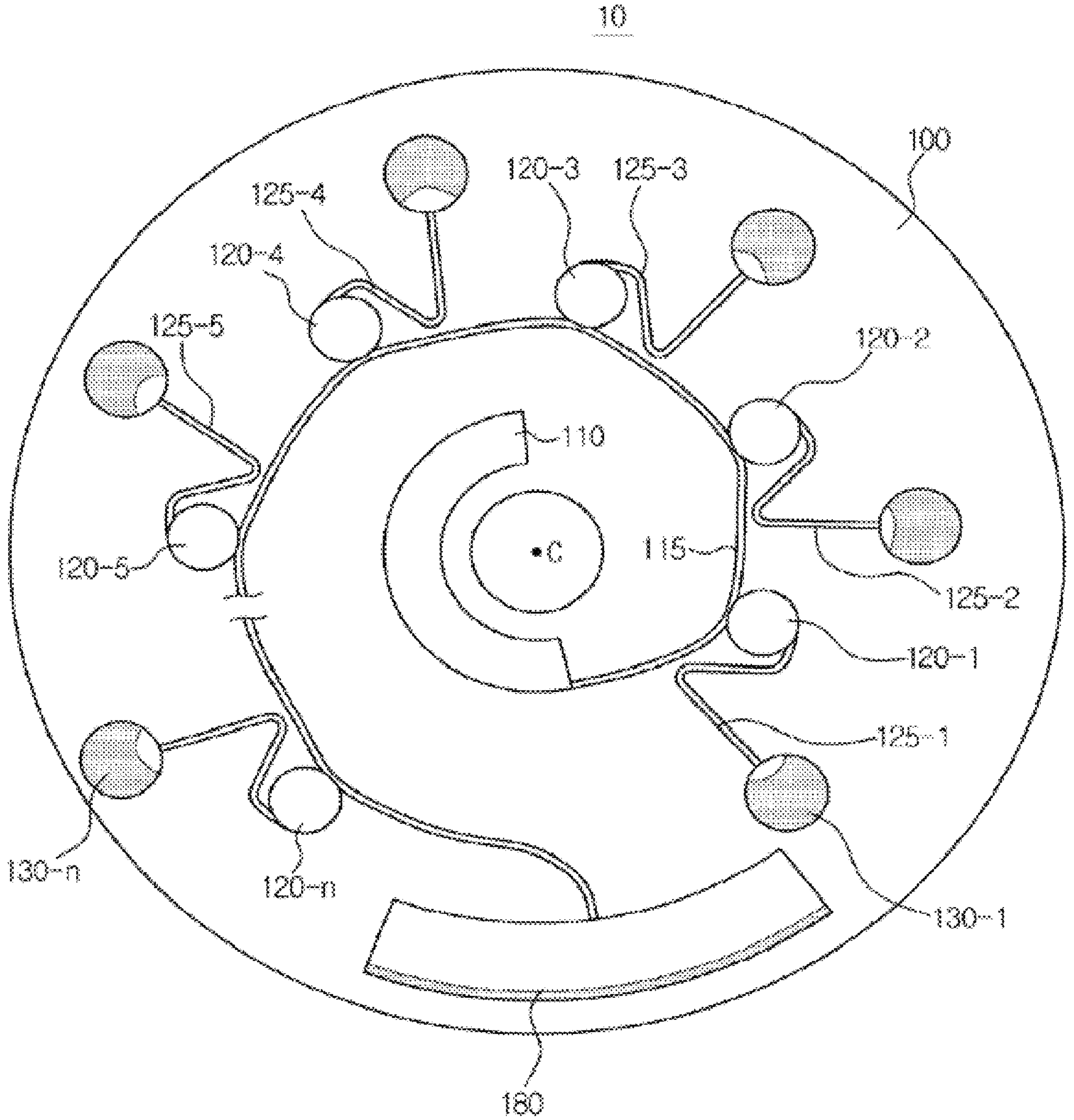

As described above, the platform 100 may be formed in various shapes including circles, circular sectors and polygons, and in the illustrated embodiment, the platform 100 has a circular shape. In addition, as shown in FIGS. 5A to 5C, at least one first chamber may be connected to a distribution channel. For convenience of description, in the illustrated embodiment it will be assumed that three first chambers 120, namely, chambers 120-1, 120-2 and 120-3 are connected in parallel to the distribution channel 115 and three second chambers 130-1, 130-2 and 130-3 are connected to the respective first chambers 120, as shown in FIG. 5C. As the ordinal number increases from the "1-3"-th chamber 120-3 to the "1-4"-th chamber 120-4 and to the "1-n"-th chamber **120-*n*, the distance of the corresponding chamber from the center of rotation C of the platform 100** increases.

When the platform 100 rotates, the fluid sample accommodated in the sample supply chamber 110 flows through the distribution channel 115. When the "1-1"-th chamber 120-1 is filled with the sample, the sample flowing through the distribution channel 115 is introduced, by centrifugal force, into the "1-2"-th chamber 120-2 arranged more distant from the center of the platform 100. In the same manner, the "1-2"-th to "1-n"-th chambers are filled with the sample. After the first chambers 120-1 to **120-*n* are all filled with the sample, the remaining sample flows into an excess chamber 180** to accommodate excess fluid.

After filling the first chambers 120, the sample flows into the second chambers 130 through the siphon channels 125, and thus, to transfer the sample through the siphon channel 125, the crest point of the siphon channel 125 should be higher than the highest level of the fluid accommodated in the sample supply chamber 110, as shown in FIG. 2. As shown in FIG. 3, in the microfluidic structure of the illustrated embodiment, the difference between the crest point of a siphon channel 125 and the corresponding one of the first chambers 120 may be kept uniform when the distance of the first chambers 120 from the center of the platform 100 increases in the order of the ordinal numbers from the "1-1"-th chamber 120-1 to the "1-n"-th chamber **120-*n***.

The capillary force of the siphon channel 125 may be established by narrowing the cross-sectional area of the siphon channel 125 or by hydrophilic treatment of the inner surfaces of the siphon channel 125. In the illustrated embodiment, the cross-sectional area of the siphon channel 125 is not limited, but the width and depth thereof may be adjusted to have a value between 0.01 mm and 3 mm, between 0.05 mm and 1 mm, or between 0.01 mm and 0.5 mm to establish a high capillary pressure. The capillary force may also be established by plasma treatment or hydrophilic polymer treatment of the inner surfaces of the siphon channel 125.

In the microfluidic device 10 according to the illustrated embodiment, the fluid sample may be a biosample of a bodily fluid such as blood, lymph and tissue fluid or urine, or an environmental sample for water quality control or soil management. However, the embodiment is not limited so long as the fluid is movable by centrifugal force.

A microfluidic structure may be formed as one unit as in the illustrated embodiment of FIG. 3, or as a plurality of units.

Figure 4A:
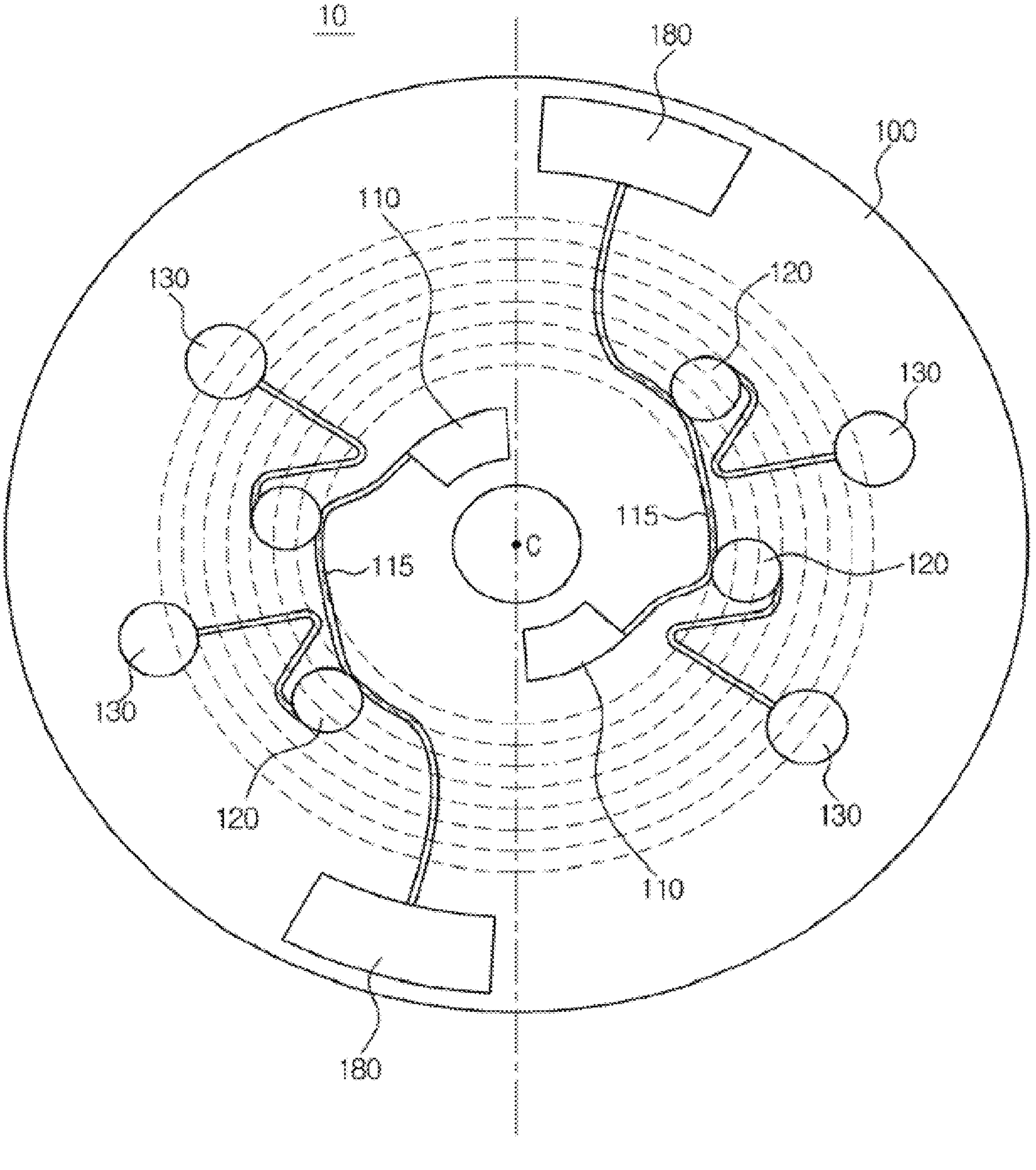
FIGS. 4A and 4B are plan views schematically illustrating a microfluidic structure including a plurality of units and a microfluidic device having the same.
Figure 4B:
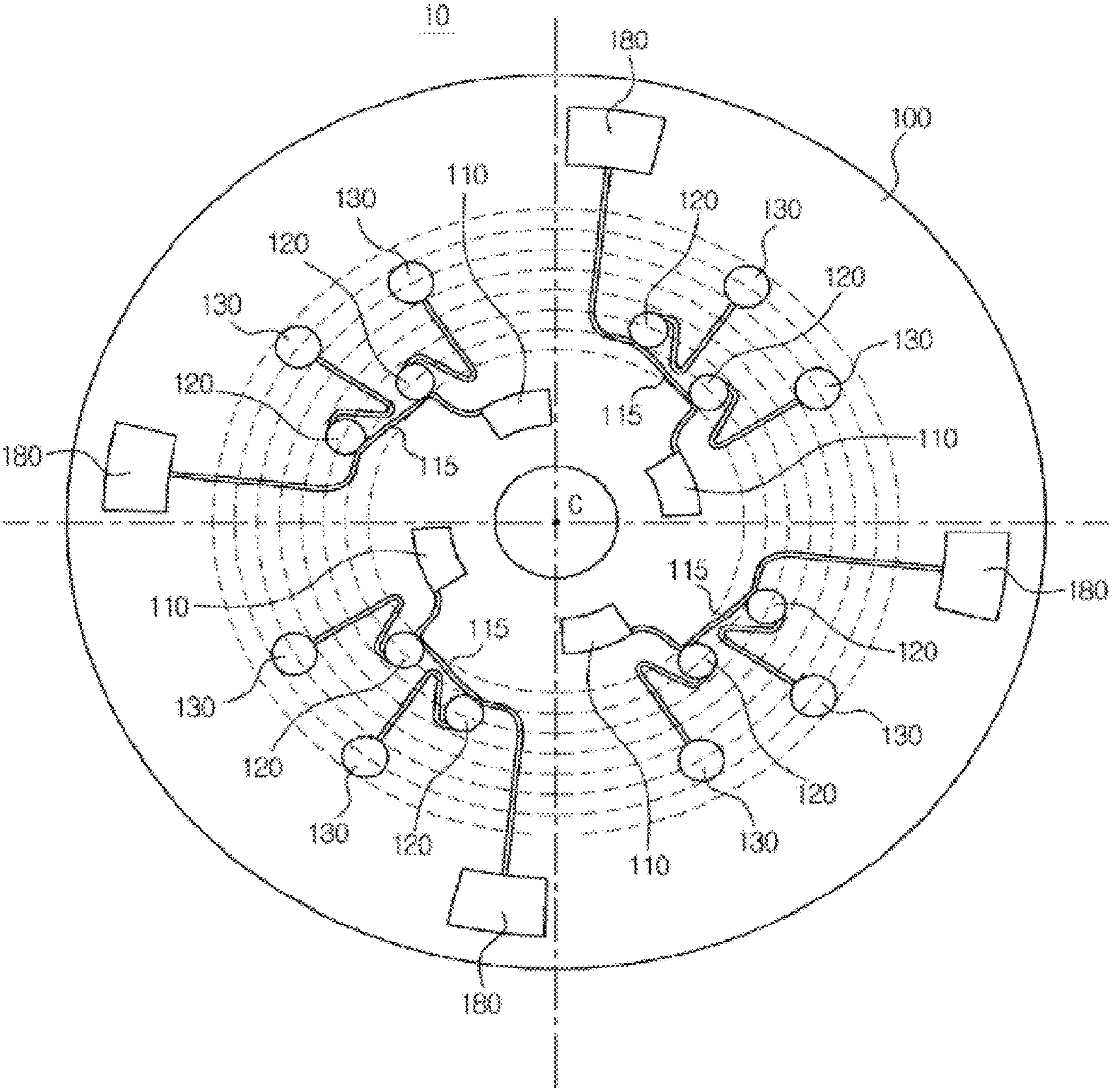

FIGS. 4A and 4B are plan views schematically illustrating a microfluidic device having a microfluidic structure that includes a plurality of units.

Referring to FIG. 4A, the platform 100 of the microfluidic device 10 according to the illustrated exemplary embodiment may be divided into two sections, with one unit having been formed in each section. As shown, each unit includes one sample supply chamber 110, a plurality of first chambers 120 and a plurality of second chambers 130.

Referring to FIG. 4B, the platform 100 of the microfluidic device 10 according to the illustrated exemplary embodiment may be divided into four sections, with one unit having been formed in each section.

Thus, when the platform 100 rotates, the sample accommodated in the sample supply chamber 110 of each unit is independently distributed to the respective first chambers 120 and thereafter, introduced into the respective second chambers 130 through the respective siphon channels 125.

As shown in FIGS. 4A and 4B, when a platform 100 is provided with two or more test units disposed thereon, several kinds of tests may be performed at the same time.

For example, a bodily fluid sample may be used to conduct an immunoserologic test in the first test unit and a biochemical test in the second test unit. Alternatively, immuno-serological tests of different kinds or biochemical tests of different kinds may be independently conducted using different samples in each of the first test unit and the second test unit.

As shown in FIG. 4B, a first immuno-serological test to detect, for example, troponin I, which is a cardiac marker, may be performed in a first test unit, a second immuno-serological test to detect, for example, β-hCG indicating pregnancy may be performed in a second test unit, a first biochemical test to detect, for example, alanine aminotransferase (ALT) and aspartate aminotransferase (AST) to evaluate liver function may be performed in a third test unit, and a second biochemical test to detect, for example, amylase and lipase indicating abnormalities of the digestive system may be performed in a fourth test unit.

Thus, when a platform 100 is provided with a plurality of test units to simultaneously perform several tests as shown in FIGS. 4A and 4B, test results may be obtained rapidly using a small sample size.

It should be understood that FIGS. 4A and 4B are shown for illustration purposes only, and the number of units that may be formed on a single platform 100 and/or the kind of tests to be performed in the respective units are not limited thereto.

FIGS. 5A to 5D are plan views schematically illustrating the flow of a fluid in the microfluidic device according to an exemplary embodiment. The structure of the microfluidic device shown in FIGS. 5A to 5D is identical to that of the microfluidic device of FIG. 3.

First, as shown in FIG. 5A, a sample is introduced into the sample supply chamber 110 while the platform 100 is at rest. Any of various types of fluid may be introduced, depending on the function of the first chambers 120 and/or the second chambers 130 or the test to be performed.

Then, the platform 100 is rotated such that the sample accommodated in the sample supply chamber 110 is distributed to all of the first chambers 120 through the distribution channel 115, as shown in FIG. 5B. FIG. 5B shows the microfluidic structure having all of the first chambers 120, from the "1-1"-th chamber 120-1 to the "1-n"-th chamber **120-*n*, filled with the sample. However, in real-world implementation, the chambers 120 from the "1-1"-th chamber 120-1 to the "1-n"-th chamber 120-*n*** are sequentially filled with the sample.

Figure 6:
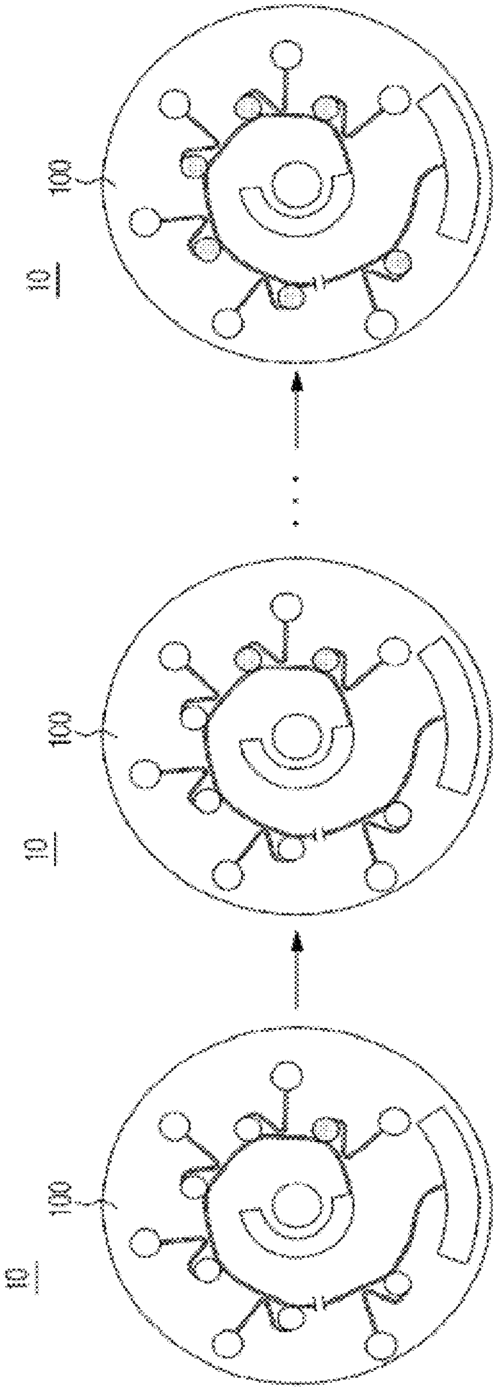
FIG. 6 is a plan view illustrating a sequence of fluid distribution to the first chambers in the microfluidic device according to the exemplary embodiment.

FIG. 6 is a plan view illustrating a sequence of fluid distribution to the first chambers in the microfluidic device according to the exemplary embodiment.

Referring to FIG. 6, when the platform 100 rotates, the sample accommodated in the sample supply chamber 110 flows into the distribution channel 115 through the outlet of the sample supply chamber 110, and then flows into the "1-1" chamber 120-1 via the distribution channel 115. Here, the platform 100 may rotate clockwise or counterclockwise. The direction of rotation of the platform 100 is not limited.

When the "1-1" chamber 120-1 is filled with sample, the fluid flowing through the distribution channel 115 does not flow into the "1-1" chamber 120-1 anymore and instead moves up to the inlet of the "1-2" chamber 120-2 and flows into the "1-2" chamber 120-2. Similarly, when the "1-2" chamber 120-2 is filled with sample, the fluid flowing through the distribution channel 115 does not flow into the "1-2" chamber 120-2 anymore and instead moves up to the inlet of the next chamber, i.e., the "1-2" chamber 120-2 and flows into the "1-2" chamber 120-2. In a similar manner, all the chambers from the "1-1"-th chamber 120-1 to the "1-n"-th chamber **120-*n* are filled with the sample. The portion of the sample remaining after filling the "1-n"-th chamber 120-*n* is accommodated in the excess chamber 180**.

Referring to FIG. 5B, when the first chamber 120 is filled with the sample by centrifugal force, part of the siphon channel 125 may also be filled with the sample. However, the sample does not fill the siphon channel 125 up to the crest point thereof, but rather, to a point between the crest point of the siphon channel 125 and the highest level of fluid in the first chamber 120.

The portion of the sample remaining after filling the first chambers 120-1 to **120-*n* is accommodated in the excess chamber 180**.

Once distribution of the sample to the first chambers 120-1 to **120-*n* is completed, rotation of the platform is stopped. When the platform 100 is stopped, the sample contained in the first chambers 120-1 to 120-*n* flows into the siphon channels 125-1 to 125-*n* by capillary pressure, thereby filling all of the siphon channels 125-1 to 125-*n*, as shown in FIG. 5**C.

When the siphon channels 125-1 to **125-*n* are filled with the sample, the platform 100 is rotated again causing the sample to flow into the second chambers 130-1 to 130-*n* by centrifugal force, as shown in FIG. 5**D.

Thus, the sample accommodated in the sample supply chamber 110 is distributed to the second chambers 130 in a fixed amount via the first chambers 120 and the siphon channels 125 according to the operations of FIGS. 5A to 5D. The amount of the sample distributed to each of the second chambers 130 may be adjusted by altering the size of the first chamber and the position of the outlet of the first chamber 120 connected to the inlet of the siphon channel 125.

When the outlets of the first chambers 120 connected to the inlets of the siphon channels 125 are located at the lowest portions of the first chambers 120 (i.e., the portions distal to the center of rotation), as shown in FIGS. 5A to 5D, all the sample filling the first chambers 120 flows into the second chambers 130, and thus the first chambers 120 are formed to have a size corresponding to the amount of sample to be distributed to the second chambers 130.

In the illustrated exemplary embodiment of FIGS. 5A to 5D, the first chambers 120 are equally sized. However, each of the first chambers 120 may be sized differently so as to contain different volumes of sample, and the size thereof may be varied depending on the amount of sample required by the chamber connected thereto.

Hereinafter, the structure and operation of the microfluidic device according to the illustrated exemplary embodiment will be described in detail with reference to FIGS. 7 to 14.

Figure 7:
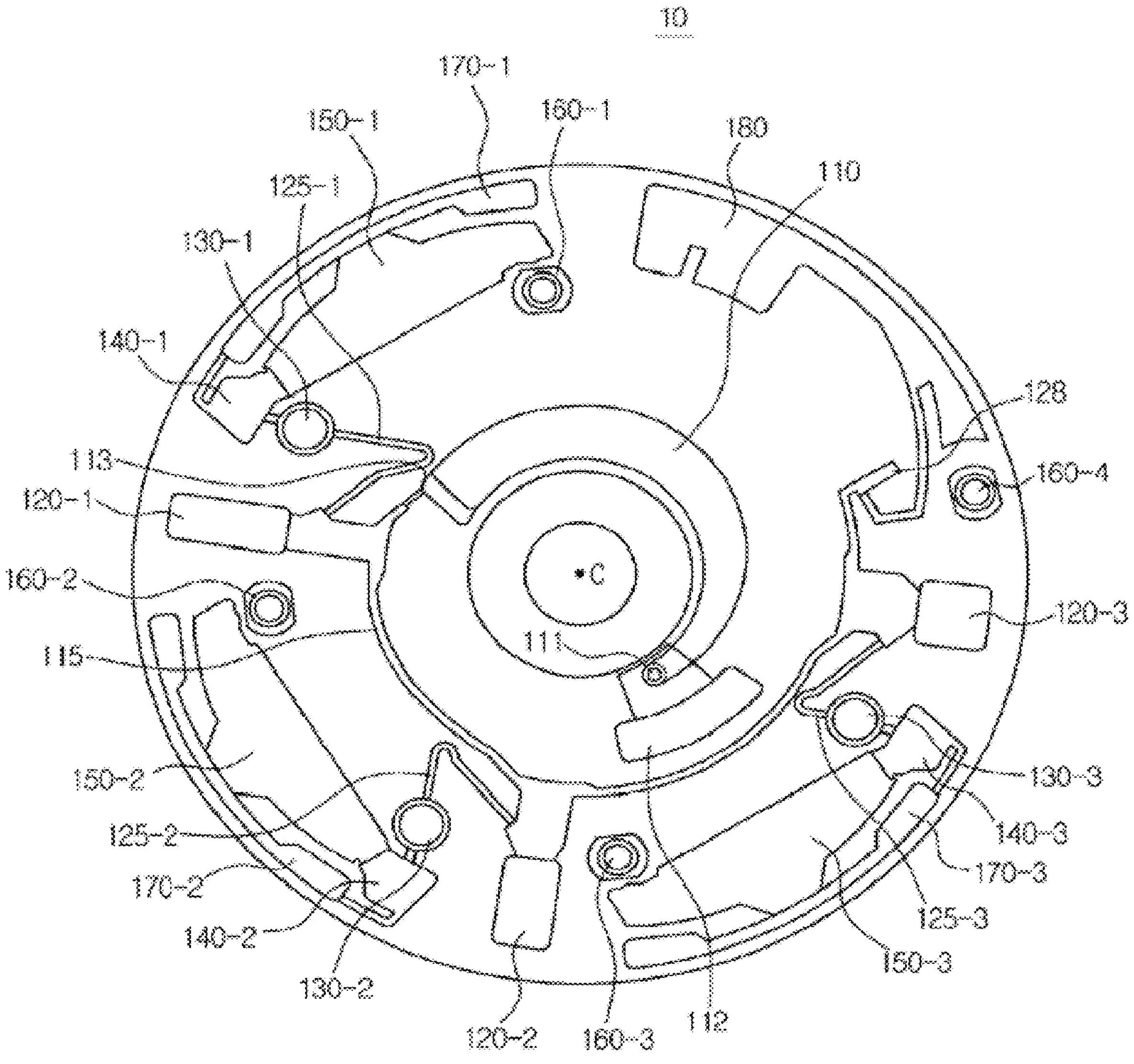
FIG. 7 is a plan view illustrating in detail the structure of the microfluidic device according to an exemplary embodiment.

FIG. 7 is a plan view illustrating the structure of the microfluidic device according to an exemplary embodiment in detail. Hereinafter, the structure of the microfluidic device 10 according to the illustrated embodiment will be described in detail with reference to FIG. 7.

As described above, the platform 100 may be formed in various shapes including circles, circular sectors and polygons. Also, for convenience of description, in the illustrated exemplary embodiment, it will be assumed that three first chambers 120, namely, chambers 120-1, 120-2 and 120-3 are connected in parallel to the distribution channel 115 and three second chambers 130-1,130-2 and 130-3 are connected to the respective first chambers 120.

Each of the first chambers 120, each of the corresponding second chambers 130 connected thereto, and any microfluidic structures connected to the corresponding second chambers 130 form a single test part, and in the illustrated embodiment, three test parts are provided. Each test part may be provided with a different configuration and a different material to be accommodated therein such that a different test may be independently conducted.

The sample supply chamber 110 is arranged closest to the center of rotation C to accommodate a sample supplied from the outside. The sample supply chamber 110 accommodates a fluid sample, and for illustration purposes only, blood is supplied as the fluid sample.

A sample introduction inlet 111 is provided at one side of the sample supply chamber 110, through which an instrument such as a pipette may be used to introduce blood into the sample supply chamber 110. Blood may be spilled near the sample introduction inlet 111 during the introduction of blood, or the blood may flow backward through the sample introduction inlet 111 during rotation of the platform 100. To prevent the microfluidic device 10 from being contaminated in this manner, a backflow receiving chamber 112 may be formed at a position adjacent to the sample introduction inlet 111 to accommodate any spilled sample during introduction thereof or any sample that flows backward.

In another exemplary embodiment, to prevent backflow of the blood introduced into the sample supply chamber 110, a structure that functions as a capillary valve may be formed in the sample supply chamber 110. Such a capillary valve allows passage of the sample only when a pressure greater than or equal to a predetermined level is applied.

In another exemplary embodiment, to prevent backflow of the blood introduced into the sample supply chamber 110, a rib-shaped backflow prevention device may be formed in the sample supply chamber 110. Such a rib-shaped back flow prevention device may include one or more protrusions formed on a surface of the sample supply chamber 110. Arranging the backflow prevention device in a direction crossing the direction of flow of the sample from the sample introduction inlet 111 to the sample discharge outlet may produce resistance to flow of the sample, thereby preventing the sample from flowing toward the sample introduction inlet 111.

The sample supply chamber 110 may be formed to have a width that gradually increases from the sample introduction inlet 111 to the sample discharge outlet 113 in order to facilitate discharge of the sample accommodated therein through the sample discharge outlet 113. In other words, the radius of curvature of at least one side wall of the sample supply chamber 110 may gradually increase from the sample introduction inlet 111 to the sample discharge outlet 113.

The sample discharge outlet 113 of the sample supply chamber 110 is connected to a distribution channel 115 formed on the platform 100 in the circumferential direction of the platform 100. Thus, the distribution channel 115 is sequentially connected to the "1-1"-th chamber 120-1, the "1-2"-th chamber 120-2 and the "1-3"-th chamber 120-3 proceeding counterclockwise. A Quality Control (QC) chamber 128 to indicate completion of supply of the sample and an excess chamber 180 to accommodate any excess sample remaining after supply of the sample may be connected to the end of the distribution channel 115.

The first chambers 120 (i.e., 120-1, 120-2, and 120-3) may accommodate the sample supplied from the sample supply chamber 110 and cause the sample to separate into a supernatant and sediment through centrifugal force. Since the exemplary sample used in the illustrated embodiment is blood, the blood may separate into a supernatant including serum and plasma and sediment including corpuscles in the first chambers 120.

Each of the first chambers 120-1, 120-2 and 120-3 is connected to a corresponding siphon channel 125-1, 125-2 and 125-3. As described above, the crest points (i.e., bend) of the siphon channels 125-1, 125-2 and 125-3 should be higher than the highest level of the fluid accommodated in the first chambers 120-1, 120-2 and 120-3. To secure a difference in height, the "1-2"-th chamber 120-2 is positioned on a circumference that is further from the center of rotation C, or a circumference of a larger radius, than the circumference on which the "1-1"-th chamber 120-1 is positioned, and the "1-3"-th chamber 120-3 is positioned on a circumference that is further from the center of rotation C, or a circumference of a larger radius, than the circumference on which the "1-2"-th chamber 120-2 is positioned.

In this arrangement, a chamber 120 positioned farther away from the sample discharge outlet 113 along the direction of flow of the distribution channel 115, will have a shorter length in a radial direction. Accordingly, if the first chambers 120 are set to have the same volume, the first chamber 120 positioned farther away from the sample discharge outlet 113 has a larger width in a circumferential direction, as shown in FIG. 7.

As described above, the positions at which the inlets of the siphon channels 125-1,125-2 and 125-3 meet the outlets of the first chambers 120-1, 120-2 and 120-3 may vary depending on the amount of fluid to be transferred. Thus, if the sample is blood, as in the illustrated exemplary embodiment, a test is often performed only on the supernatant, and therefore the outlets of the first chambers 120 may be arranged at upper portions (i.e., above the middle portion)

thereof, at which the supernatant is positioned. This is simply an embodiment provided for illustration, and if the sample is not blood or the test is performed on the sediment in addition to the supernatant, outlets may be provided at lower portions of the first chambers 120.

The outlets of the siphon channels 125-1,125-2 and 125-3 are connected to the respective second chambers 130-1, 130-2 and 130-3. The second chambers 130 may accommodate only a sample (e.g., blood), or may have a reagent or reactant pre-stored therein. The reagent or reactant may be used, for example, to perform pretreatment or first order reaction for blood, or to perform a simple test prior to the main test. In the illustrated exemplary embodiment, binding between an analyte and a first marker conjugate occurs in the second chambers 130.

Specifically, the first marker conjugate may remain in the second chamber 130 in a liquid phase or solid phase. When the marker conjugate is solid phase, the inner wall of the second chamber 130 may be coated with the marker conjugate or the marker conjugate may be temporarily immobilized on a porous pad disposed therein.

The first marker conjugate is a complex formed by combining a marker and a capture material which specifically reacts with an analyte in the sample. For example, if the analyte is antigen Q, the first marker conjugate may be a conjugate of the marker and antibody Q which specifically reacts with antigen Q.

Exemplary markers include, but are not limited to, latex beads, metal colloids including gold colloids and silver colloids, enzymes including peroxidase, fluorescent materials, luminescent materials, superparamagnetic materials, materials containing lanthanum (III) chelates, and radioactive isotopes.

Also, If test paper on which a chromatographic reaction occurs is inserted into the reaction chamber 150, as described below, a second marker conjugate which binds with a second capture material may be immobilized on the control line of the test paper to confirm reliability of the reaction. In various exemplary embodiments, the second marker conjugate may also be in a liquid phase or solid phase and, when in solid phase, the inner wall of the second chamber 130 may be coated with the second marker conjugate or the second marker conjugate may be temporarily immobilized on a porous pad disposed therein.

The second marker conjugate is a conjugate of the marker and a material specifically reacting with the second capture material immobilized on the control line. The marker may be one of the aforementioned exemplary materials. If the second capture material immobilized on the control line is biotin, a conjugate of streptavidin and the marker may be temporarily immobilized in the second chamber 130.

Accordingly, when blood flows into the second chamber 130, antigen Q present in the blood binds with the first marker conjugated with antibody Q and is discharged to the third chamber 140. At this time, the second marker conjugated with streptavidin is also discharged.

The second chambers 130-1,130-2 and 130-3 are connected to the third chambers 140-1,140-2 and 140-3, and in the illustrated embodiment, the third chambers 140-1,140-2 and 140-3 are used as metering chambers. The metering chambers 140 function to meter a fixed amount of sample (e.g., blood) accommodated in the second chamber 130 and supply the fixed amount of blood to the respective fourth chambers 150 (150-1, 150-2, and 150-3). The metering operation of the metering chambers will be described below with reference to FIG. 14 and FIGS. 15 to 17.

The residue in the metering chambers 140 which has not been supplied to the fourth chambers 150 may be transferred to the respective waste chambers 170 (170-1, 170-2, and 170-3). In the illustrated exemplary embodiment, the connection between the metering chambers 140 and the waste chambers 170 is not limited to FIG. 14. The metering chambers 140 may not be directly connected to the waste chambers 170 (see FIGS. 15 and 16), or the metering chambers 140 and the waste chambers 170 may be connected in different arrangements (see FIG. 18).

The third chambers 140-1,140-2 and 140-3 are connected to the reaction chambers 150-1,150-2 and 150-3 which are the fourth chambers. Although not shown in detail, the third chambers may be connected to the fourth chambers via channels, or by a specific structure to transfer the fluid. The latter case will be described in detail with reference to FIGS. 15 to 17.

A reaction may occur in the reaction chambers 150 in various ways. For example, in the illustrated embodiment, chromatography based on capillary pressure is used in the reaction chambers 150. To this end, the reaction chamber 150 includes a detection region 20 to detect the presence of an analyte through chromatography.

Figure 8:
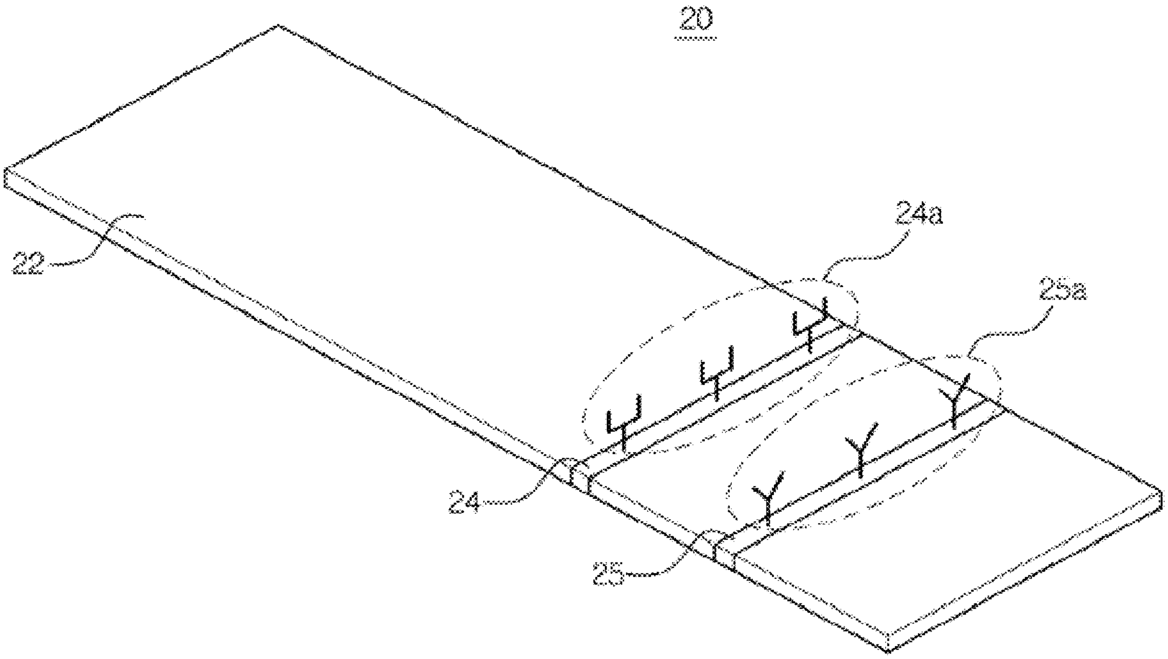
FIG. 8 is a view illustrating a structure of a detection region included in a reaction chamber.
Figure 9A:
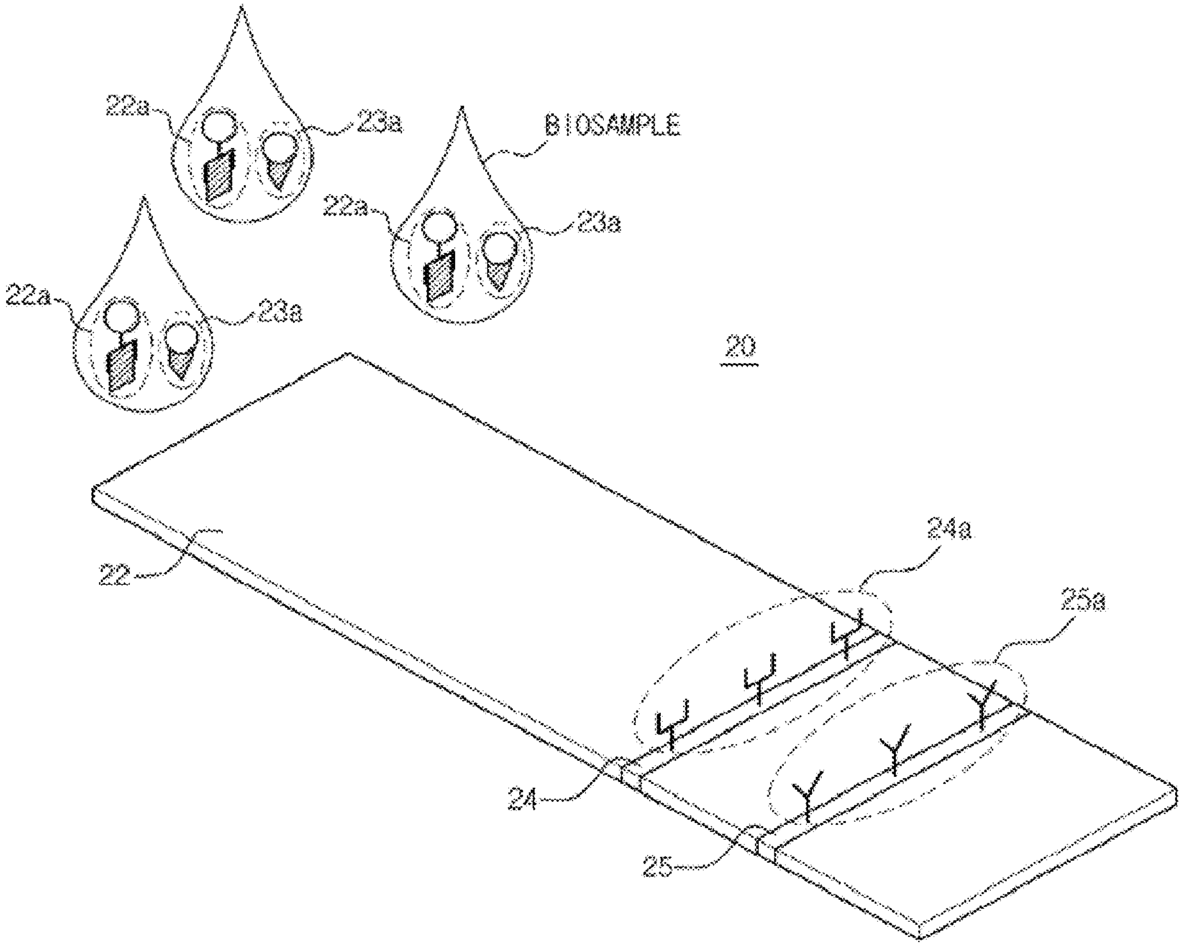
FIGS. 9A to 9C are views illustrating detection of an analyte using chromatography.
Figure 9B:
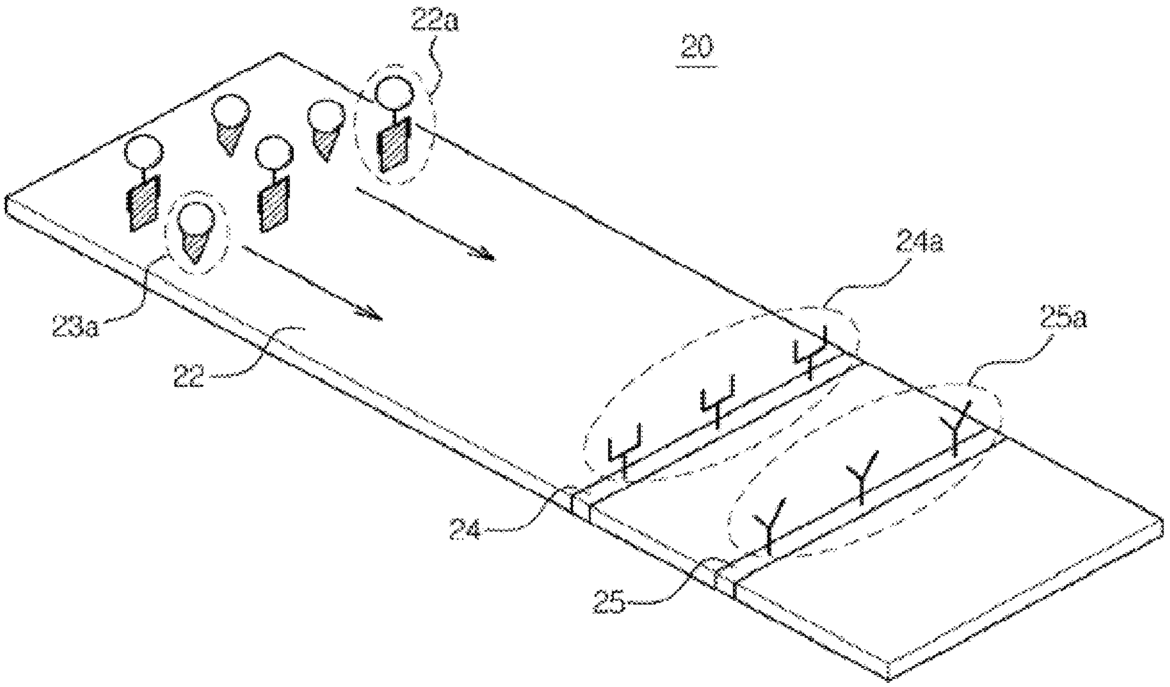
Figure 9C:
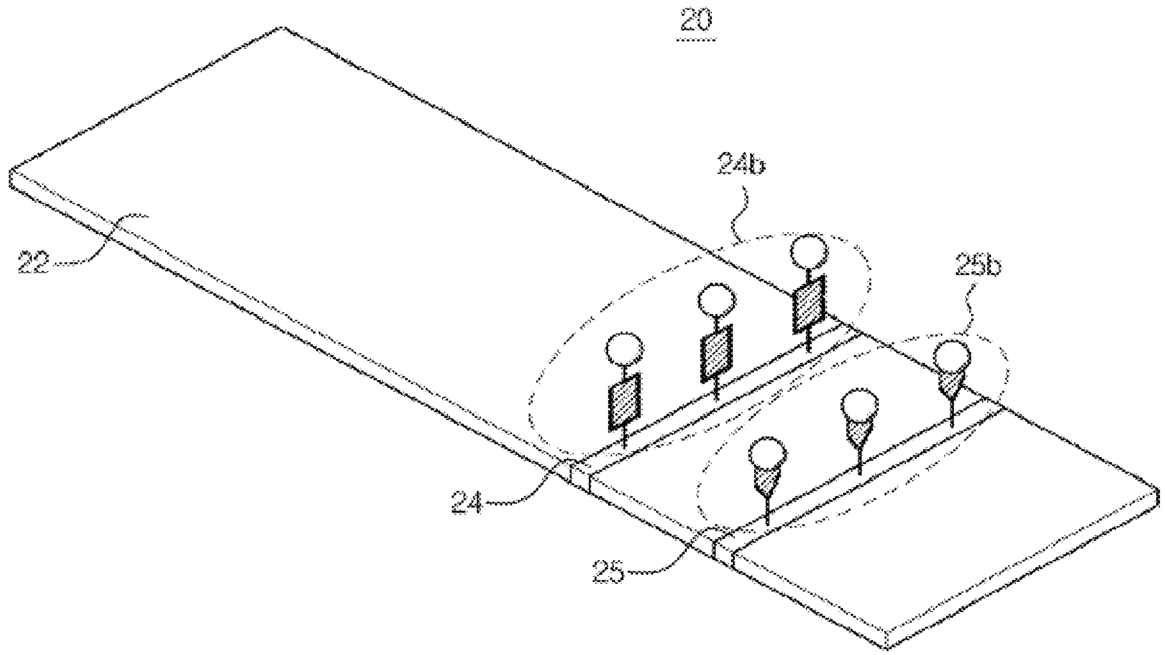

FIG. 8 is a view illustrating a structure of a detection region included in a reaction chamber, and FIGS. 9A to 9C are views illustrating detection of an analyte using chromatography.

The detection region 20 is formed from a material selected from a micropore, micro pillar, and thin porous membrane such as cellulose, upon which capillary pressure acts. Referring to FIG. 8, a sample pad 22 on which the sample is applied is formed at one end of the detection region 20, and a test line 24 is formed at an opposite end, on which a first capture material 24*a* to detect an analyte, is permanently immobilized. Here, permanent immobilization means that the first capture material 24*a* immobilized on the test line 24 does not move along with flow of the sample.

Referring to FIGS. 9A and 9B, when a biosample such as blood or urine is dropped on the sample pad 22, the biosample flows to the opposite side due to capillary pressure. For example, if the analyte is antigen Q and binding between the analyte and the first marker conjugate occurs in the second chamber 130, the biosample will contain a conjugate of antigen Q and the first marker conjugate.

When the analyte is antigen Q, the capture material 24*a* permanently immobilized on the test line 24 may be antibody Q. In this case, when the biosample flowing according to the capillary pressure reaches the test line 24, the conjugate 22*a* of antigen Q and the first marker conjugate binds with antibody Q 24*a* to form a sandwich conjugate 24*b*. Therefore, if the analyte is contained in the biosample, it may be detected by the marker on the test line 24.

A normal test may fail for various reasons such as small sample amount and/or sample contamination. Accordingly, to determine whether the test has been properly performed, the detection region 20 may be provided with a control line 25 on which is permanently immobilized a second capture material 25*a* that specifically reacts with a material contained in the sample regardless of presence of the analyte.

As the second capture material 25*a* immobilized on the control line 25, biotin may be used, and thus the second marker conjugate 23*a* contained in the sample in the second chamber 130 may be a streptavidin-marker conjugate, which has a high affinity to biotin.

Referring to FIGS. 9A to 9C, the second marker conjugate 23*a* having a material that specifically reacts with the second capture material 25*a* is contained in the sample. When the sample is transferred to the opposite side by capillary pressure, the second marker conjugate 23*a* is also moved along with the sample. Accordingly, regardless of presence of the analyte in the sample, a conjugate 25*b* is formed by conjugation between the second marker conjugate 23*a* and the second capture material 25*a*, and is marked on the control line 25 by the marker.

In other words, if a mark by the marker appears on both the control line 25 and the test line 24, the sample will be deemed positive, which indicates that the analyte is present in the sample. If the mark appears only on the control line 25, the sample will be deemed negative, which indicates that the analyte is not present in the sample. However, if the mark does not appear on the control line 25, test malfunction may be determined.

As shown in FIGS. 8 and 9, the maker conjugate may be provided in the second chamber 130. However, such embodiments are not limited thereto. It may be possible that the maker conjugate is temporarily immobilized on a conjugate pad 23 provided in the detection region 20 in the reaction chamber 150. Here, temporary immobilization means the marker conjugate immobilized on the conjugate pad 23 is moved away by flow of the sample.

Figure 10:
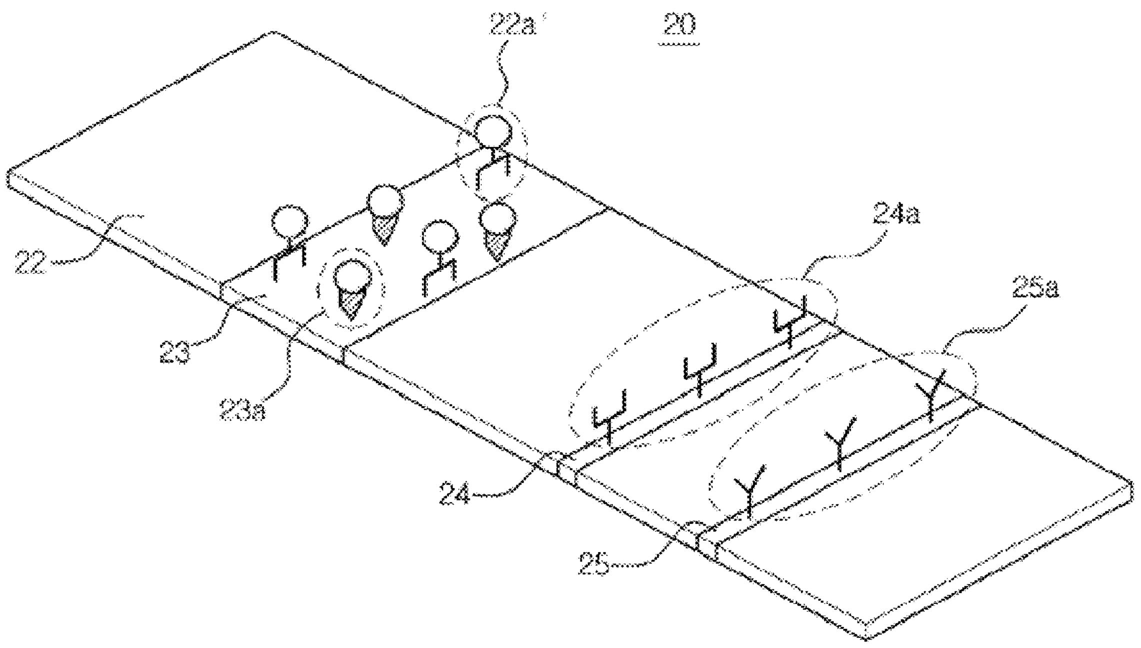
FIG. 10 is a view illustrating the structure of the detection region provided with a conjugate pad.

FIGS. 10 and 11 are views illustrating the structure of a detection region including a conjugate pad and the detection operation therein.

Referring to FIG. 10, the detection region 20 may be provided with a conjugate pad 23 in addition to the sample pad 22, the test line 24, and the control line 25. A first marker conjugate 22*a*' which is a conjugate of a marker and the first capture material specifically reacting with the analyte may be temporarily immobilized on the conjugate pad 23. The second marker conjugate 23*a*, which is a conjugate between the marker and a material specifically reacting with the second capture material 25*a* immobilized on the control line 25, may also be temporarily immobilized on the conjugate pad 23.

Figure 11A:
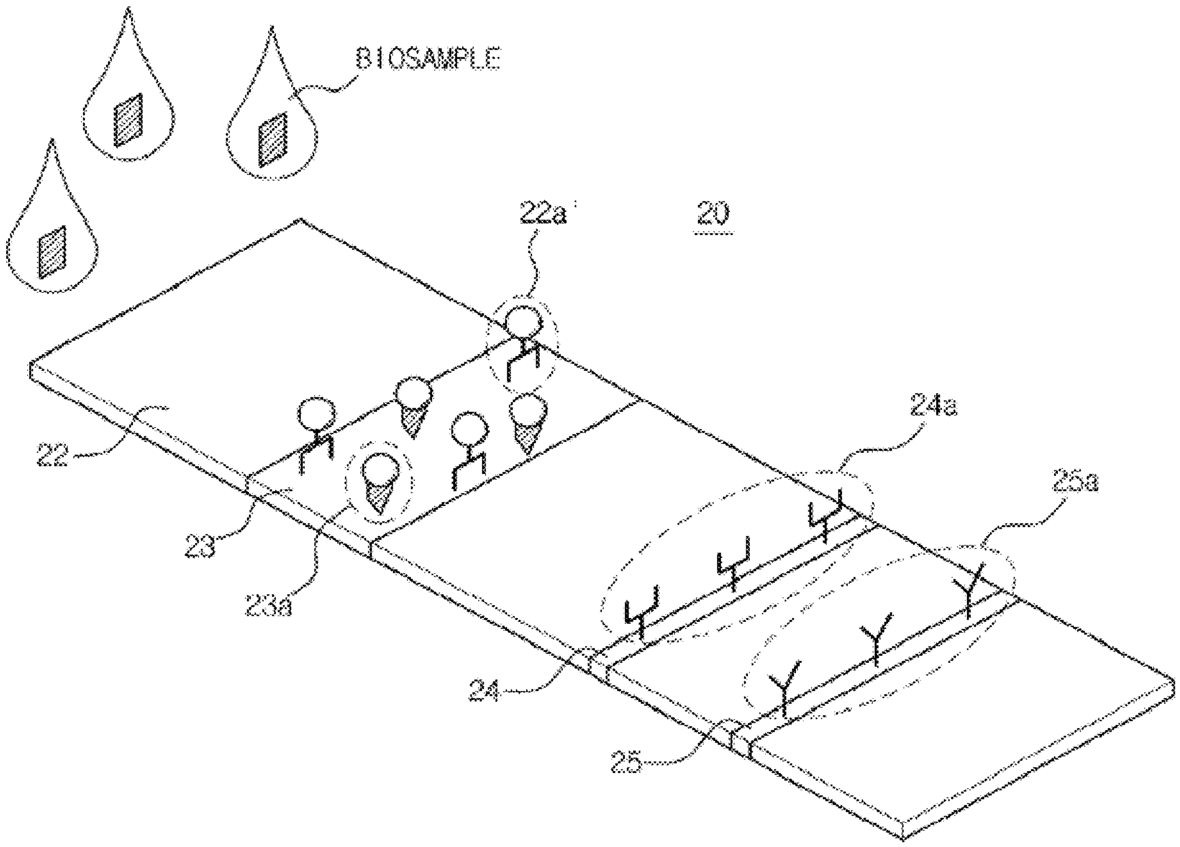
FIGS. 11A to 11C are views illustrating a detection operation in the detection region provided with the conjugate pad.
Figure 11B:
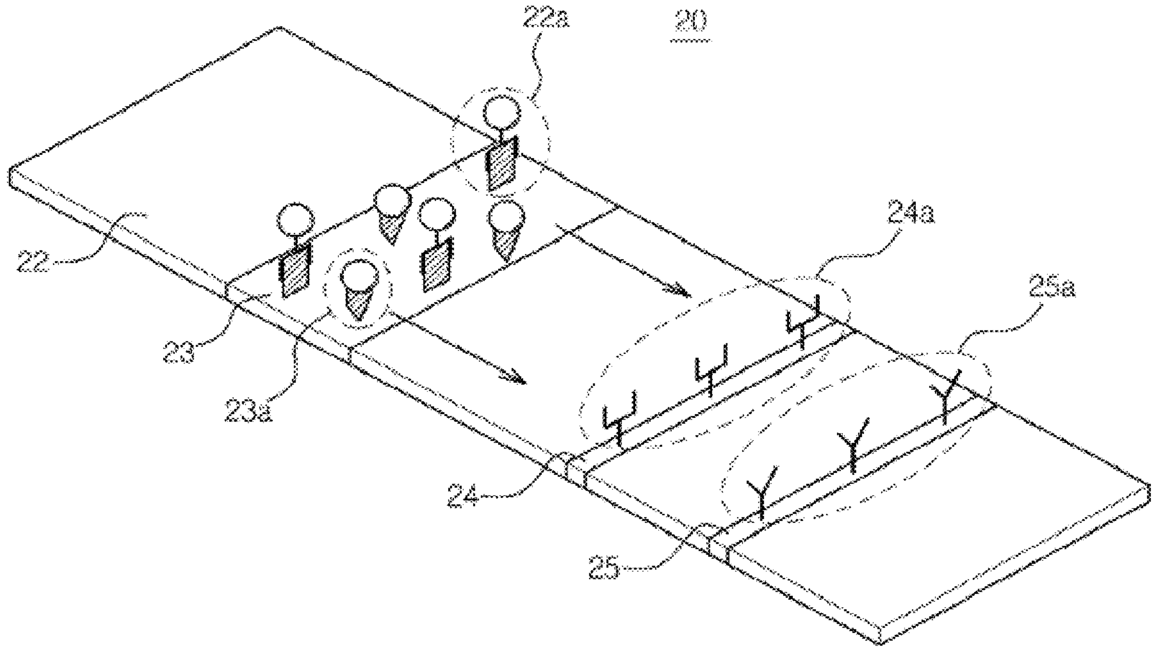

Referring to FIG. 11A, when a biosample such as blood is dropped on the sample pad 22, the biosample flows toward the control line 25 due to capillary pressure. If the analyte of interest is contained in the sample, it binds with the first marker conjugate 22*a'* on the conjugate pad 23 to form the conjugate 22*a* of the analyte and the marker conjugate, as shown in FIG. 11B. The biosample further flows due to capillary force, thereby causing the conjugate 22*a* and the second marker conjugate 23*a* to flow therewith.

Figure 11C:
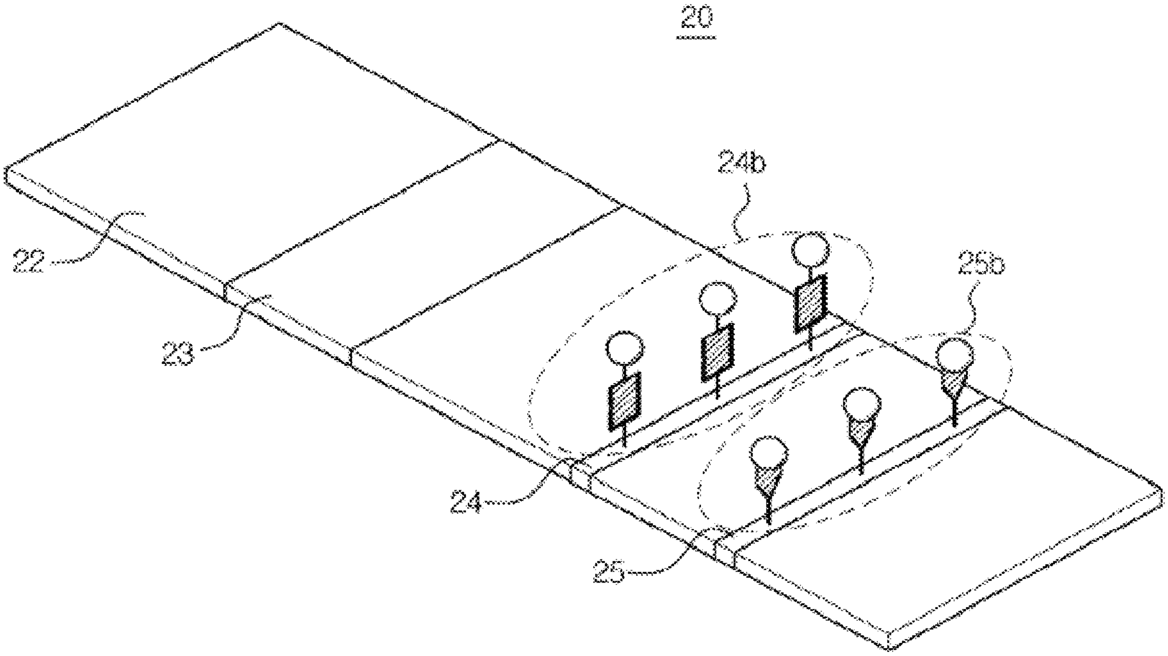

As the flowing biosample reaches the test line 24 and the control line 25, the capture material 24*a* binds with the conjugate 22*a* to form a sandwich conjugate 24*b* on the test line 24, as shown in FIG. 11C. On the control line 25, the second marker conjugate 23*a* binds with the second capture material 25*a* to form a conjugate 25*b*.

If the reaction chamber 150 of the microfluidic device is provided with the detection region 20 of FIGS. 10 and 11, the marker conjugates 22*a*' and 23*a* are temporarily immobilized on the detection region 20, and thus the second chamber 130 may be used as the metering chamber. When the second chamber 130 is used as the metering chamber, the third chamber 140 is used as the reaction chamber.

In another exemplary embodiment, rather than using chromatography, a capture antigen or capture antibody may be provided in the reaction chamber 150 to react with a certain antigen or antibody in the sample such that a binding reaction with the capture antigen or capture antibody occurs in the reaction chamber 150.

Referring to FIG. 7, the reaction chambers 150-1, 150-2 and 150-3 are connected to the respective fifth chambers, i.e., the waste chambers 170-1, 170-2 and 170-3. The waste chambers 170-1, 170-2 and 170-3 accommodate impurities discharged from the reaction chambers 150-1, 150-2 and 150-3 and/or residue remaining after the reaction is completed.

Meanwhile, the platform 100 may be provided with one or more magnetic bodies for position identification. For example, in addition to chambers in which a sample or residue is accommodated or a reaction occurs, the platform 100 may be provided with magnetic body accommodating chambers 160-1,160-2,160-3 and 160-4. The magnetic body accommodating chambers 160-1,160-2,160-3 and 160-4 accommodate a magnetic body, which may be formed of a ferromagnetic material such as iron, cobalt and nickel which have a high intensity of magnetization and form a strong magnet like a permanent magnet, a paramagnetic material such as chromium, platinum, manganese and aluminum which have a low intensity of magnetization and thus do not form a magnet alone, but may become magnetized when a magnet approaches to increase the intensity of magnetization, or a diamagnetic material such as bismuth, antimony, gold and mercury which are repelled by magnetic fields.

Figure 12:
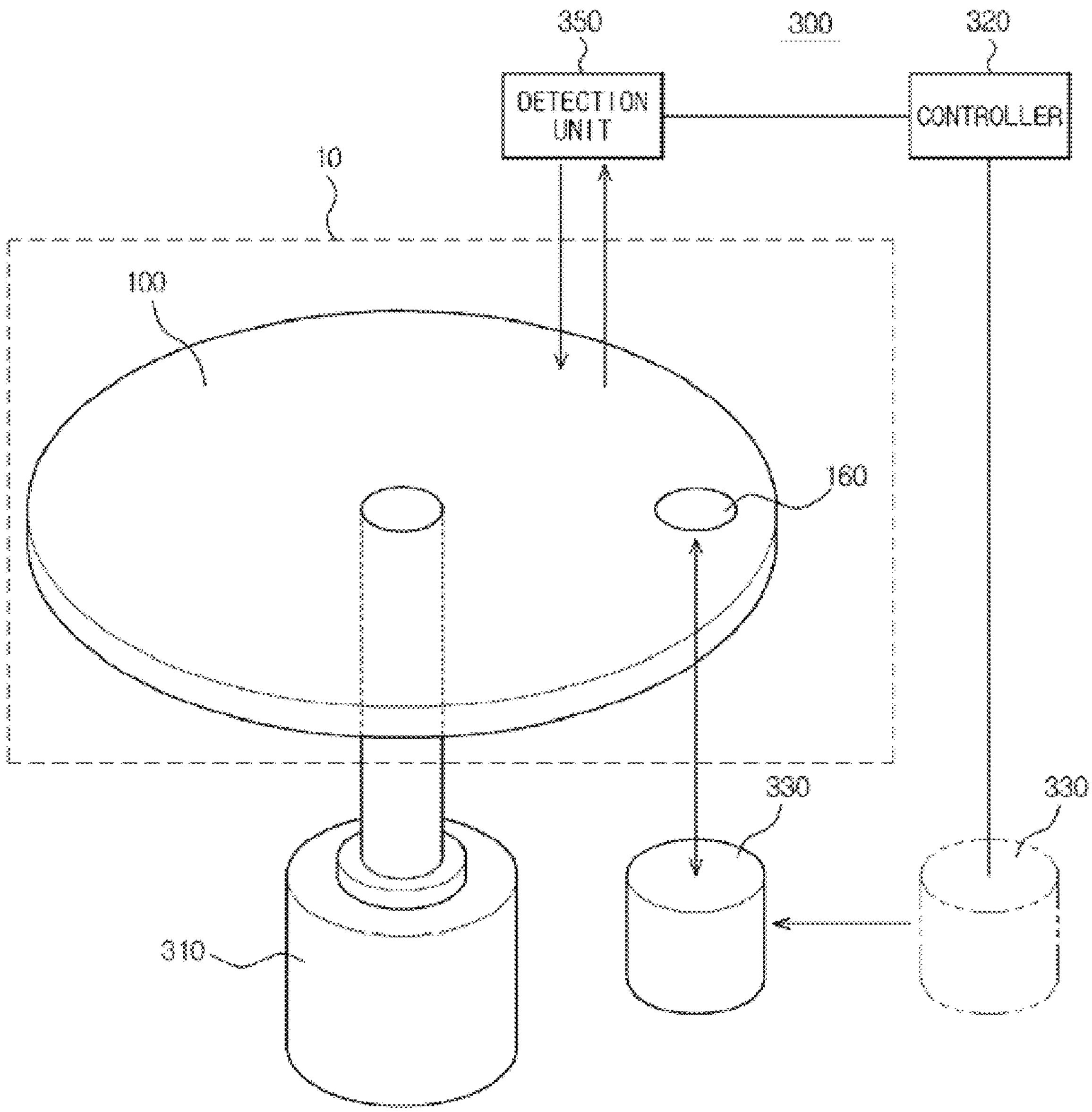
FIG. 12 is a view illustrating a function of a magnetic body accommodating chamber provided in the microfluidic device according to an exemplary embodiment.

FIG. 12 is a view illustrating a function of a magnetic body accommodating chamber provided in the microfluidic device according to an exemplary embodiment.

Referring to FIG. 12, the test device 300 using the microfluidic device 10 is provided with a magnetic module 330 to attract a magnetic body under the platform 100, and a detection unit 350 arranged over the platform 100 to detect various kinds of information on the platform 100. The detection unit 350 may be arranged adjacent to the position facing the magnetic module 330. Operations of the magnetic module 330 and the detection unit 350 may be controlled by a controller 320.

The magnetic module 330 may be positioned so as not to influence the rotation of the platform 100, and may be transported to a position under the platform 100 when the operation of position identification is required. When the magnetic module 330 is positioned under the platform 100, it may attract the magnetic body accommodated in the magnetic body accommodating chamber 160, thereby causing the platform 100 to rotate according to magnetic attractive force such that the magnetic body accommodating chamber 160 is aligned with the magnetic module 330. To allow the magnetic body accommodating chamber 160 to be easily attracted by the magnet module 330, the magnetic body accommodating chamber 160 may be formed to protrude downward from the platform 100.

Since the detection unit 350 is located adjacent to a position facing the magnetic module 330, information contained in a detection area may be detected by the detection unit 350 by forming the magnetic body accommodating chamber 160 at a position adjacent to the detection object region within the platform 100. The detection area may be a QC chamber 128 or a reaction chamber 140. Any area which has detectable information may be used as the detection area.

The detection unit 350 may be provided with a light emitting unit and a light receiving unit. The light emitting unit and the light receiving unit may be integrally formed and arranged facing in the same direction, as shown in FIG. 12, or formed separately and arranged to face each other. If the light emitting unit is a planar luminous body having a large light emitting area, the detection unit 350 may detect information related to a chamber to be detected even when the distance between the magnetic body accommodating chamber 160 and the chamber is long. The detection operation of the detection unit 350 will be described below in detail with reference to FIG. 14.

In the illustrated exemplary embodiment, the magnetic module 330 is adapted to move on the lower side of the platform. Alternatively, it may be adapted to move on the upper side of the platform.

Allowing the magnetic body accommodating chambers 160-1, 160-2 and 160-3 to perform the operation of position identification as in the illustrated embodiment is simply one example. In another example, instead of providing the magnetic body accommodating chamber 160 in the microfluidic device, a motor may be used to control an angular position of the platform 100 such that a certain position on the platform 100 faces the detection unit 350.

Figure 13:
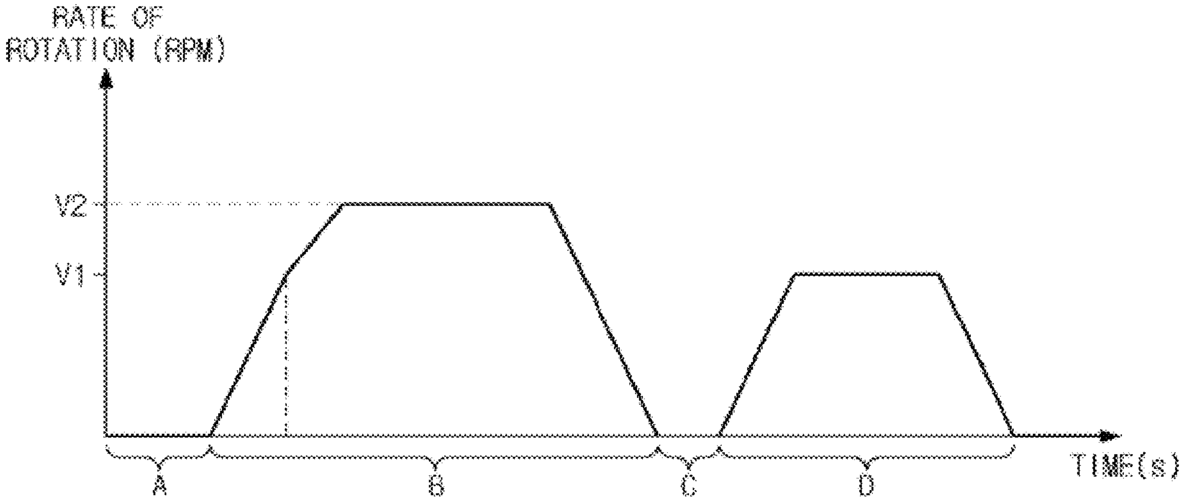
FIG. 13 is a graph schematically illustrating the rotational speed of a platform during respective fluid transfer operations in the microfluidic device according to an exemplary embodiment.

FIG. 13 is a graph schematically illustrating the rotational speed of a platform during respective fluid transfer operations in the microfluidic device according to an exemplary embodiment, and FIGS. 14A to 14E are plan views illustrating flow of a fluid within the microfluidic device according to the exemplary embodiment. The structure of the microfluidic device of FIGS. 14A to 14E is the same as that of the microfluidic device of FIG. 7.

Referring to FIG. 13, the operation of transferring the fluid within the microfluidic device 10 may be broadly divided into: introducing a sample (A), distributing the sample (B), wetting a siphon channel (C), and transferring the sample (D). Here, wotting refers to an operation of filling the siphon channel 125 with the fluid. Hereinafter, operations of the microfluidic device will be described with reference to the graph of FIG. 13 and the plan views of FIG. 14A to 14E showing the respective operations.

Figure 14A:
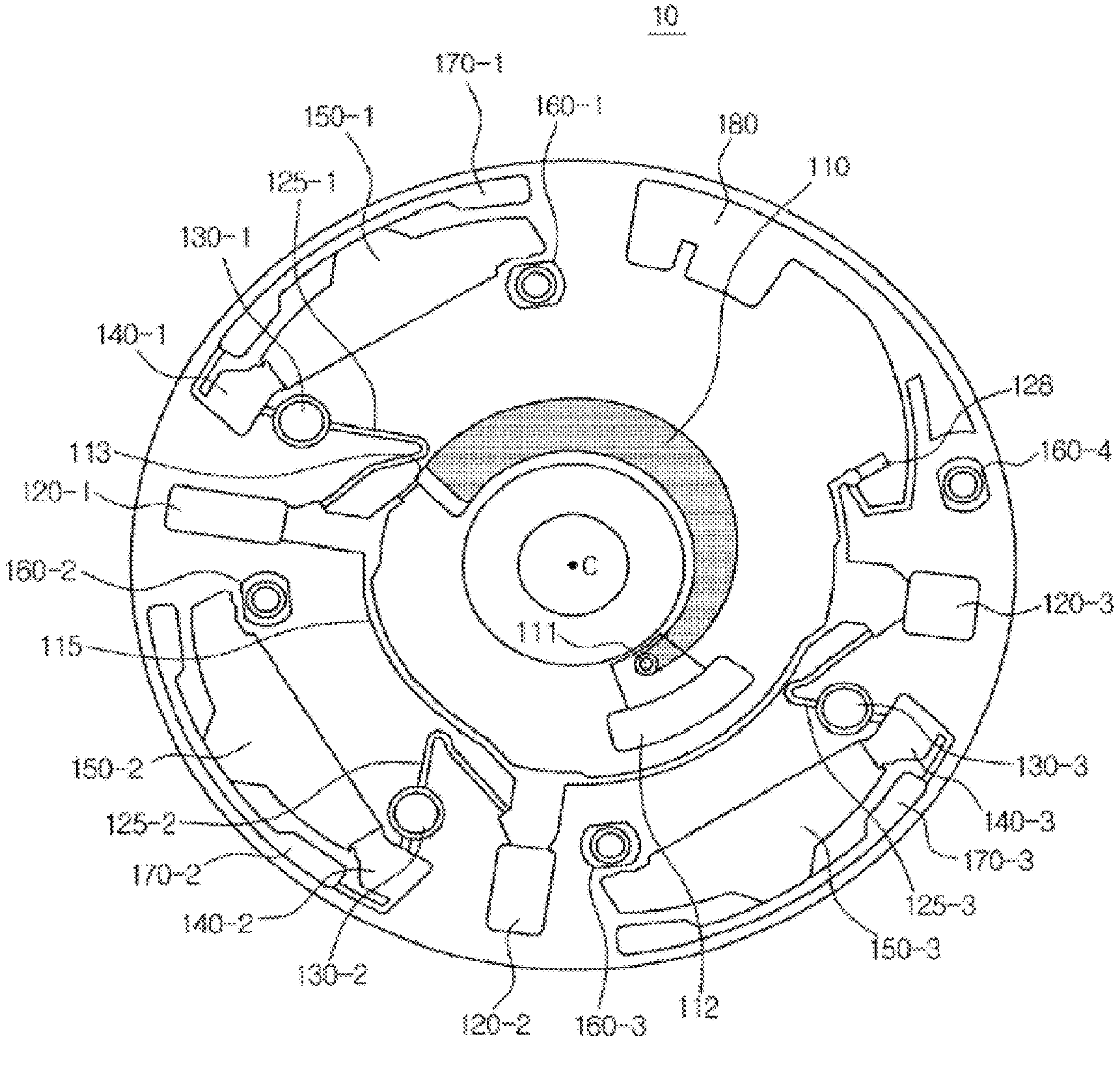
FIGS. 14A to 14E are plan views illustrating flow of a fluid in the microfluidic device according to the exemplary embodiment.

FIG. 14A is a plan view of the microfluidic device 10 during the operation of introducing a sample (A). A sample is introduced into the sample supply chamber 110 through the sample introduction inlet 111 while the platform 100 is at rest (rpm=0). In the present exemplary embodiment, a blood sample is introduced. Since a backflow receiving chamber 112 is arranged at a portion adjacent to the sample introduction inlet 111, contamination of the microfluidic device 10 due to blood dropped at a place other than the sample introduction inlet 111 may be prevented during the operation of introducing the sample.

Figure 14B:
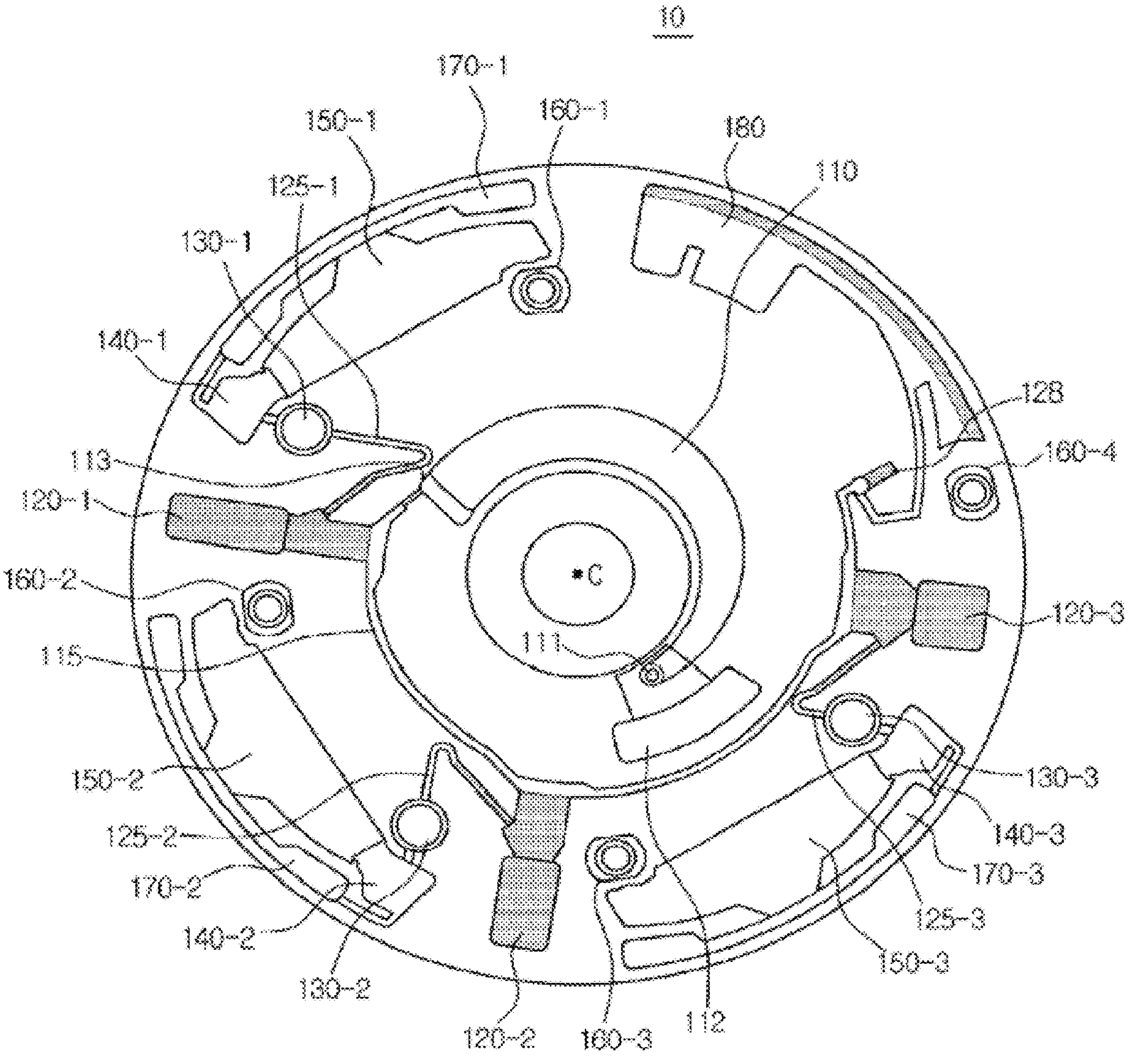

FIG. 14B is a plan view of the microfluidic device 10 which is in the operation of distributing the sample (B). When introduction of the sample is completed, distribution of the sample to the first chambers 120 is initiated. At this lime, the platform 100 begins to rotate and the rate of rotation (rpm) thereof increases. If a test is performed on a blood sample as in the illustrated exemplary embodiment, centrifugation may be performed along with distribution of the sample. Through such centrifugation, the blood may separate into the supernatant and the sediment. The supernatant includes serum and plasma, and the sediment includes corpuscles. The portion of the sample used in the test described herein is substantially the supernatant.

As illustrated in FIG. 13, the rotational speed is increased to v1 to distribute the blood accommodated in the sample supply chamber 110 to the "1-1"-th chamber 120-1, the "1-2"-th chamber 120-2 and the "1-3"-th chamber 120-3 using centrifugal force. Thereafter, the rotational speed is increased to v2 to allow centrifugation to occur within each chamber. When the blood accommodated in each chamber is centrifuged, the supernatant gathers at a position proximal to the center of rotation, while the sediment gathers at a position distal to the center of rotation. In the exemplary embodiment shown in FIGS. 14A to 14E, the first chambers 120 are formed to contain the same volume of sample. However, the first chambers 120 may be formed with different sizes, depending on the amounts of fluid to be distributed thereto.

In addition, as describe above with reference to FIG. 5B, the siphon channels 125 may be partially filled with blood by capillary force during distribution of the blood. When supply of blood to the "1-1"-th chamber 120-1, the "1-2"-th chamber 120-2 and the "1-3"-th chamber 120-3 is completed, any excess blood not supplied to the first chambers 120 remains in the sample supply chamber 110 and flows into the QC chamber 128 through the distribution channel 115. Further, any excess blood which does not flow into the QC chamber 128 flows into the excess chamber 180.

As shown in FIG. 14B, a magnetic body accommodating chamber 160-4 is formed at a position adjacent to the QC chamber 128. As such, the magnetic module 330 described above may cause the QC chamber 128 to face the detection unit 350. Accordingly, when the detection unit 350 faces the QC chamber 128, it may measure transmittance of the QC chamber 128 and determine whether the supply of blood to the first chambers 120 has been completed.

Figure 14C:
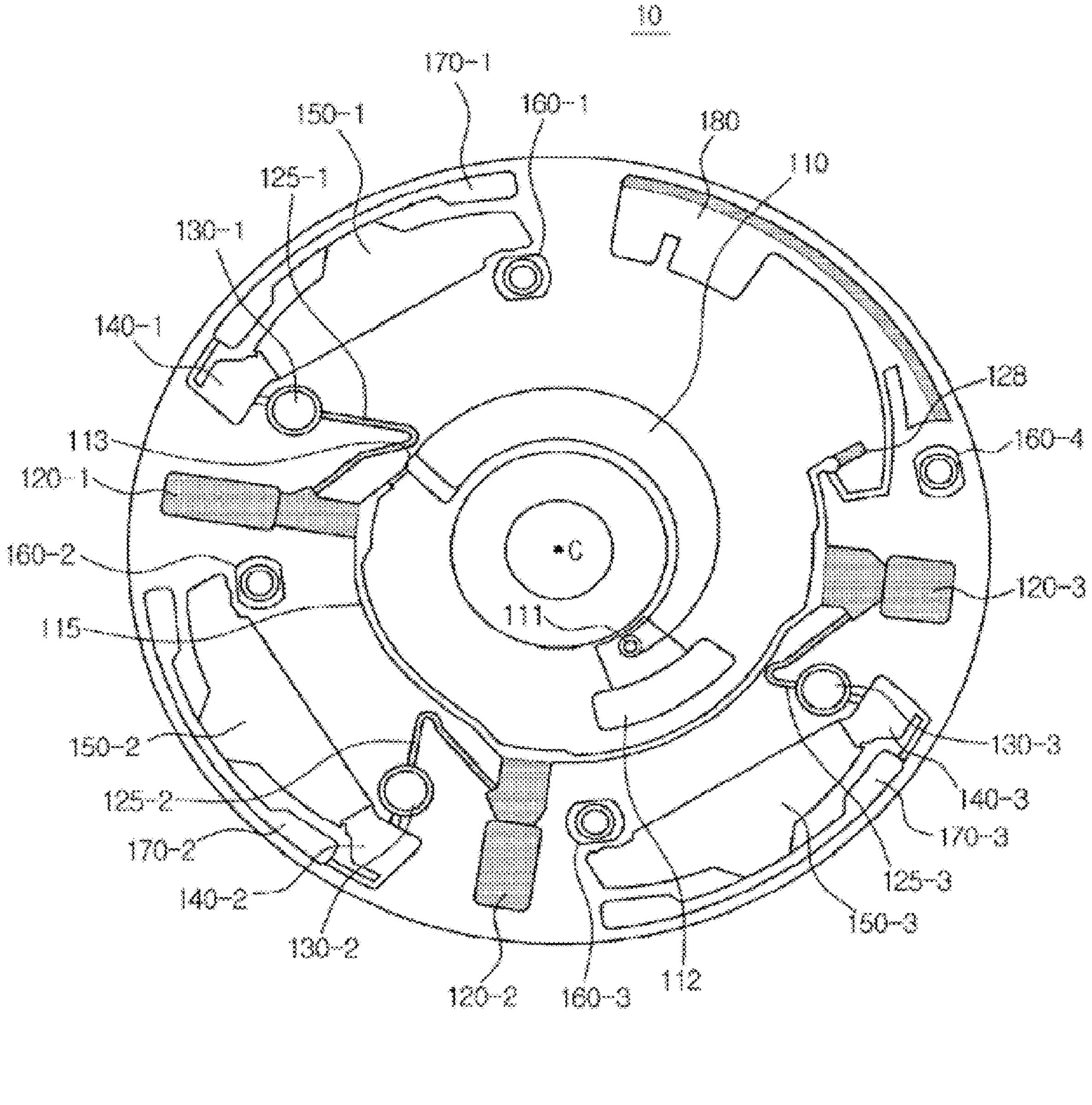

FIG. 14C is a plan view of the microfluidic device which is in the operation of wetting siphon channels (C). Once distribution and centrifugation of the blood are completed, the platform 100 is stopped (rpm=0), thereby permitting the blood accommodated in the first chambers 120-1, 120-2 and 120-3 fills the siphon channels 125-1,125-2 and 125-3 by capillary pressure.

Figure 14D:
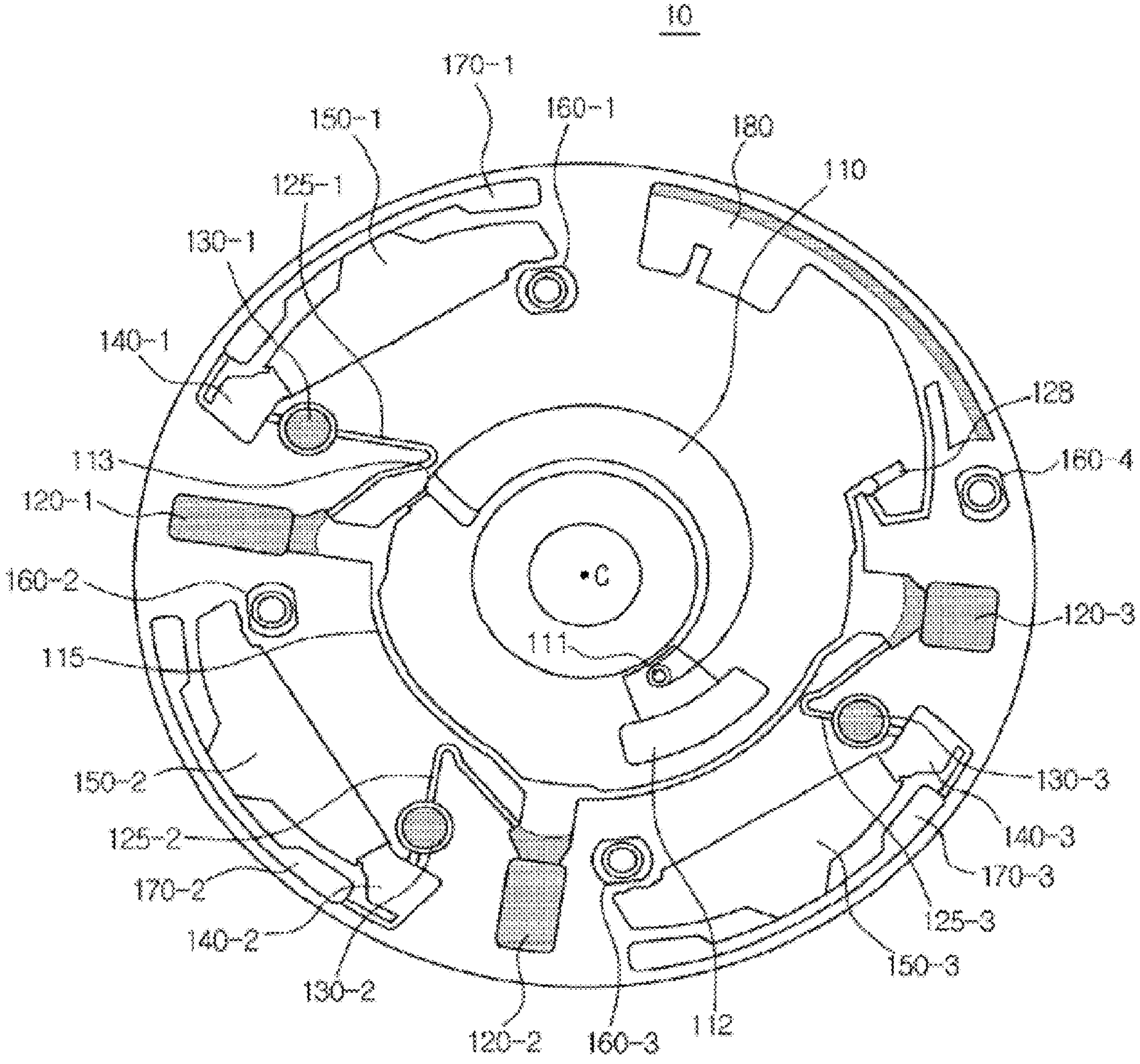

FIG. 14D is a plan view of the microfluidic device which is in the operation of transferring the sample to the second chamber 130 (D). When wetting of the siphon channels 125 is completed, the platform 100 is rotated again to allow the blood filling the siphon channels 125-1,125-2 and 125-3 to flow into the second chambers 130-1,130-2 and 130-3. As shown in FIG. 14D, the inlets of the siphon channels 125-1,125-2 and 125-3 are connected to the upper portions of the first chambers 120-1, 120-2 and 120-3 (the portions proximal to the center of rotation), and thus the supernatant of the blood sample flows into the second chambers 130-1, 130-2 and 130-3 via the siphon channels 125-1,125-2 and 125-3.

The second chambers 130 may simply serve to temporarily accommodate the blood flowing thereinto, or allow, as described above, binding between a specific antigen in the blood and a marker conjugate pre-provided in the second chambers 130.

Figure 14E:
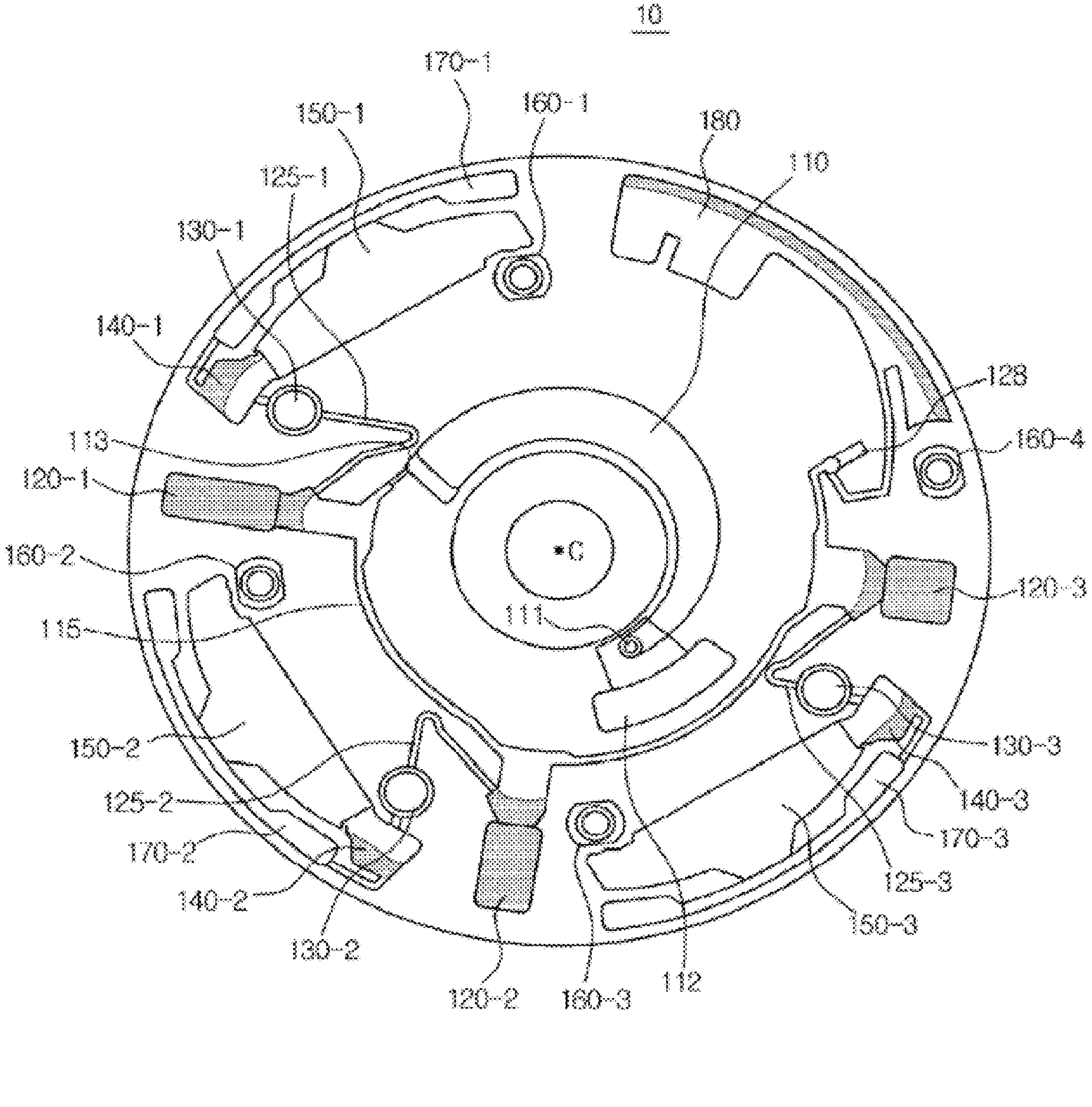

FIG. 14E is a plan view of the microfluidic device which is in the operation of transferring the sample to the motoring chambers 140 (D). The blood flowing into the second chambers 130-1,130-2 and 130-3 is then introduced into the third chambers, i.e., the metering chambers 140-1,140-2 and 140-3 by centrifugal force. By centrifugal force, the metering chambers 140-1,140-2 and 140-3 are filled with blood from the lower portion of the second chambers 130, i.e., from the portion distal to the center of rotation. After the metering chambers 140-1,140-2 and 140-3 are filled with blood up to the outlets thereof, blood subsequently introduced into the metering chambers 140-1,140-2 and 140-3 flows into the reaction chambers 150-1, 150-2 and 150-3 through the outlets of the metering chambers 140-1,140-2 and 140-3. Therefore, the positions of the outlets of the metering chambers 140 may be adjusted to supply a fixed amount of blood to the reaction chambers 150. This is simply an example of metering. Metering the fluid sample may be performed in the manner illustrated in FIGS. 15 to 17.

The reaction occurring in the reaction chambers 150 may be immunochromatography or a binding reaction with a capture antigen or capture antibody, as described above.

As shown in FIG. 14E, if the magnetic body accommodating chambers 160-1, 160-2 and 160-3 are formed at positions adjacent to the corresponding reaction chambers 150-1,150-2 and 150-3, the positions of the reaction chambers 150-1,150-2 and 150-3 may be identified by a magnet.

Accordingly, when the reaction is completed, the magnet is moved to a position under the platform 100, thereby causing the detection unit 350 and the reaction chamber 150 to be positioned facing each other due to attractive force between the magnet 330 and the magnetic body. The detection unit 350 may therefore detect the result of the reaction in the reaction chamber 150 by capturing an image of the reaction chamber.

Hereinafter, another example of metering a fluid in the microfluidic device will be described in detail.

Figure 15:
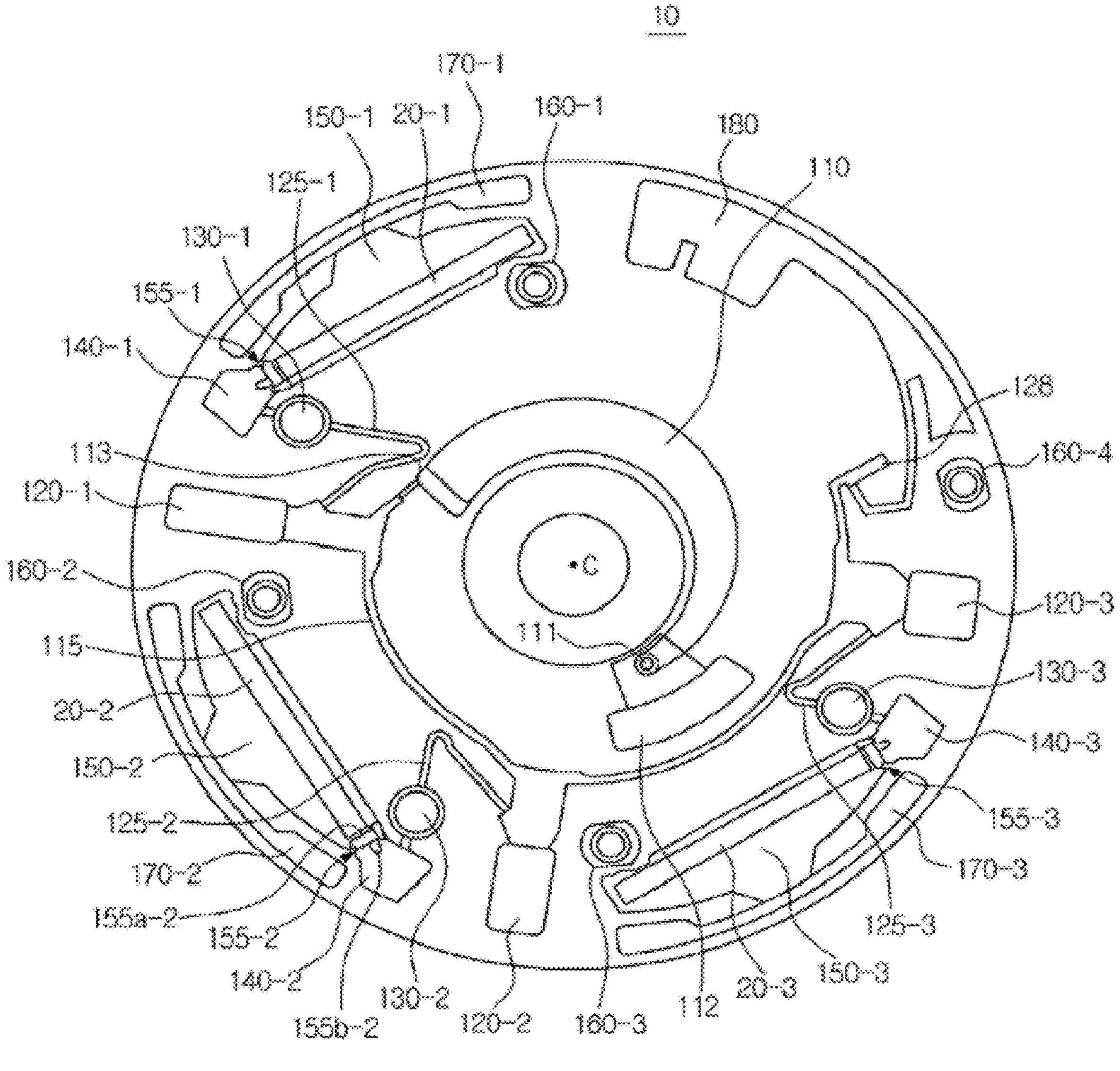
FIG. 15 is a plan view illustrating the structure of the microfluidic device which further includes a fluid transfer assist unit.

FIG. 15 is a plan view illustrating the structure of the microfluidic device which further includes a fluid transfer assist unit.

Referring to FIG. 15, the microfluidic device 10 described with reference to FIG. 7 may further include a fluid transfer assist unit 155 arranged between the metering chamber 140 and the reaction chamber 150 to support the transfer of the fluid. In the illustrated embodiment, the three pairs of the metering chambers 140-1, 140-2 and 140-3 and the reaction chambers 150-1, 150-2 and 150-3 respectively include fluid transfer assist units 155-1, 155-2 and 155-3.

The fluid transfer assist unit 155 includes a fluid guide **155*b* to guide movement of the fluid from the metering chamber 140 to the reaction chamber 150, and a fluid passage 155*a* allowing the fluid to flow from the metering chamber 140 to the reaction chamber 150 therethrough. The fluid guide 155*b* is shaped to protrude from the reaction chamber 150 toward the metering chamber 140, and the fluid passage is formed to have a greater width than other channels so as to facilitate passage of the fluid. However, the fluid transfer assist unit 155 does not necessarily require inclusion of the fluid guide 155*b*. Alternatively, only the fluid passage 155*a*** may be provided.

In addition, in the illustrated embodiment, the reaction occurs in the reaction chamber using chromatography, and to this end, the reaction chamber 150 is provided with the detection region 20 described above with reference to FIGS. 8 to 11. Each of the three test units may perform testing independently, and in the illustrated embodiment, the three test units are respectively provided with detection regions 20-1, 20-2 and 20-3.

The fluid transfer assist unit 155 not only serves to control the rotational speed of the platform 100, but also causes the fluid accommodated in the metering chamber to be transferred to the reaction chamber 150 by the amount desired by a user. Hereinafter, the function of the fluid transfer assist unit 155 will be described with reference to FIG. 16.

Figure 16A:
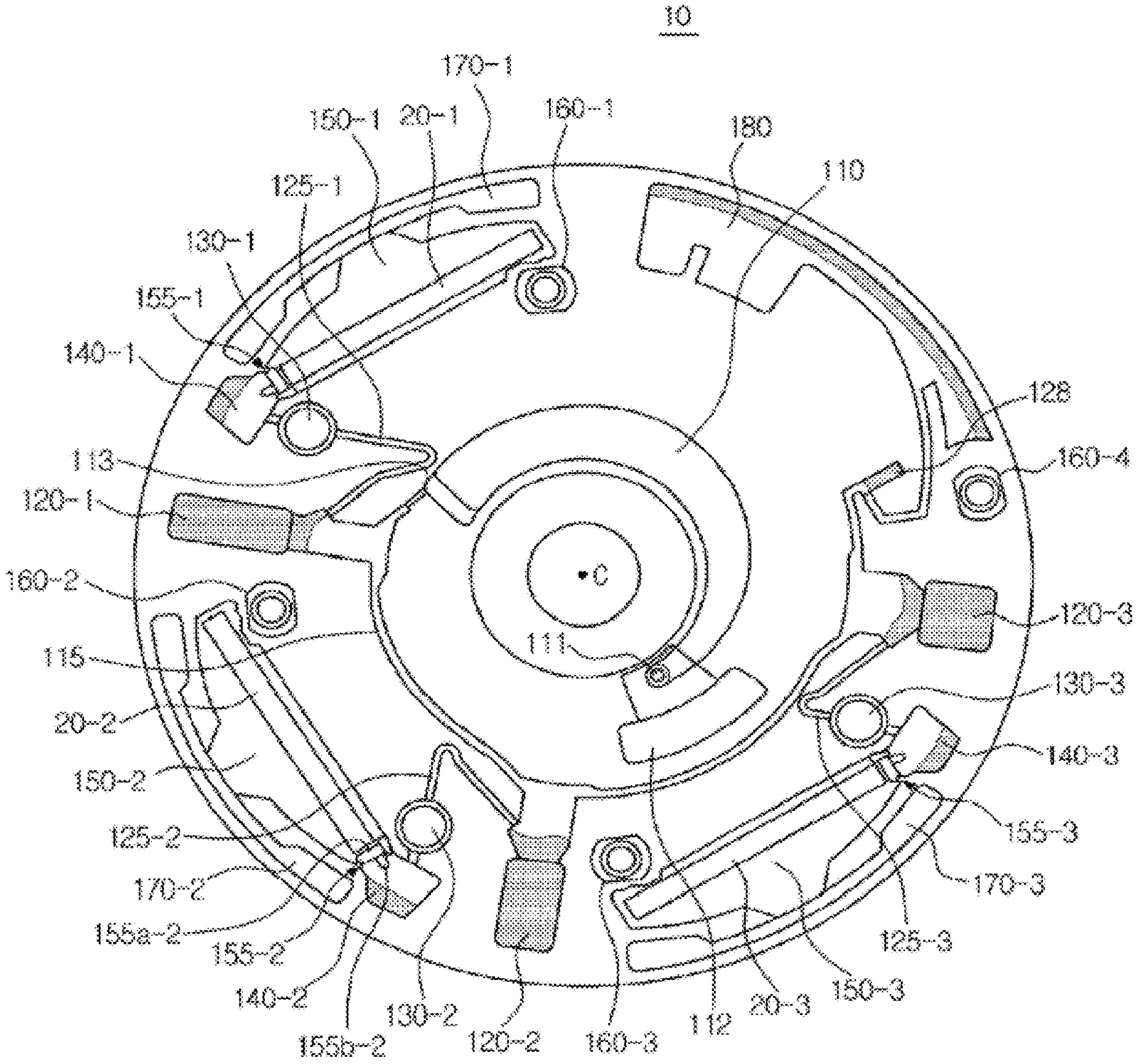
FIGS. 16A to 16E are plan views illustrating flow of a fluid in the microfluidic device of FIG. 15.
Figure 16B:
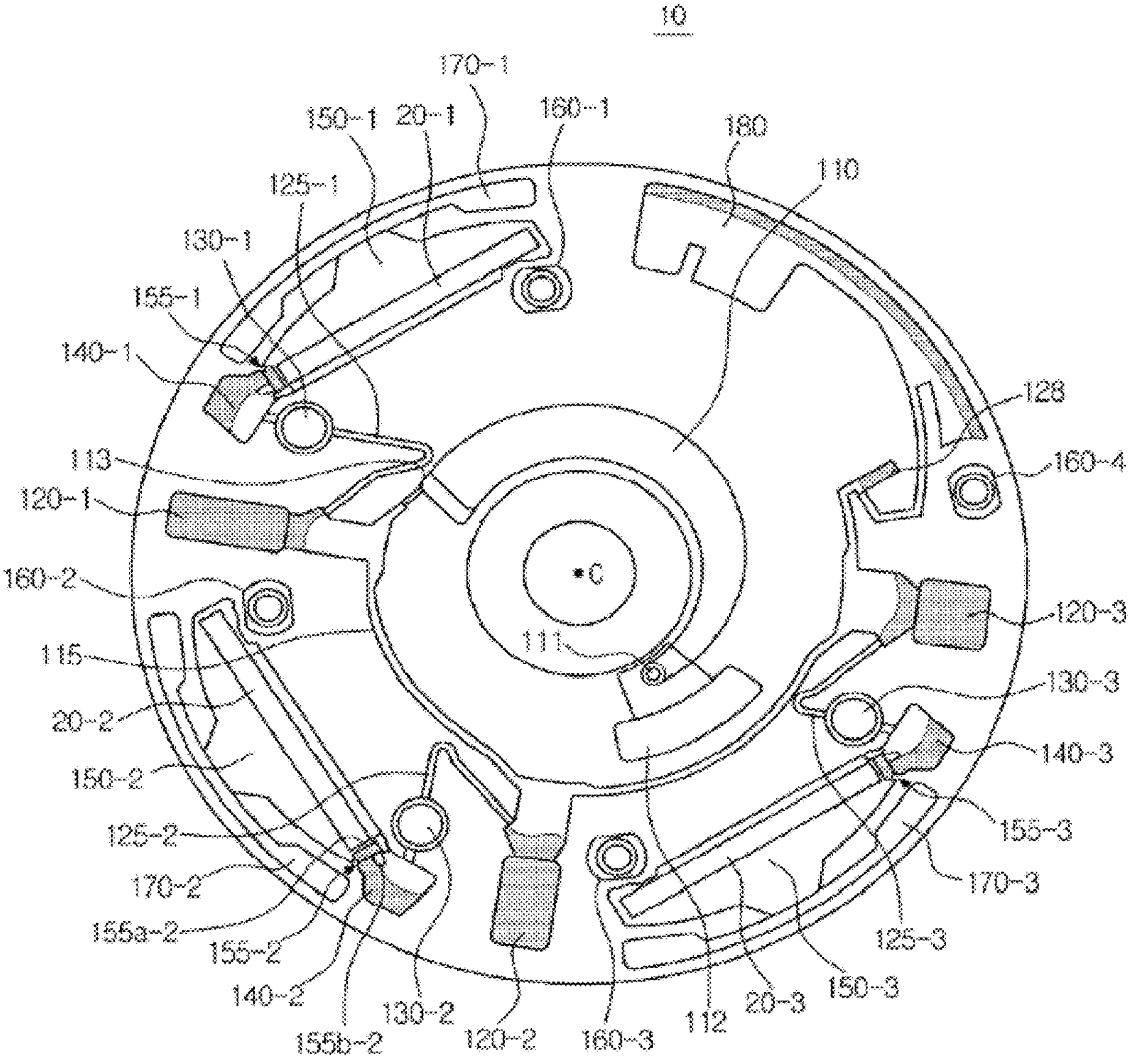
Figure 16C:
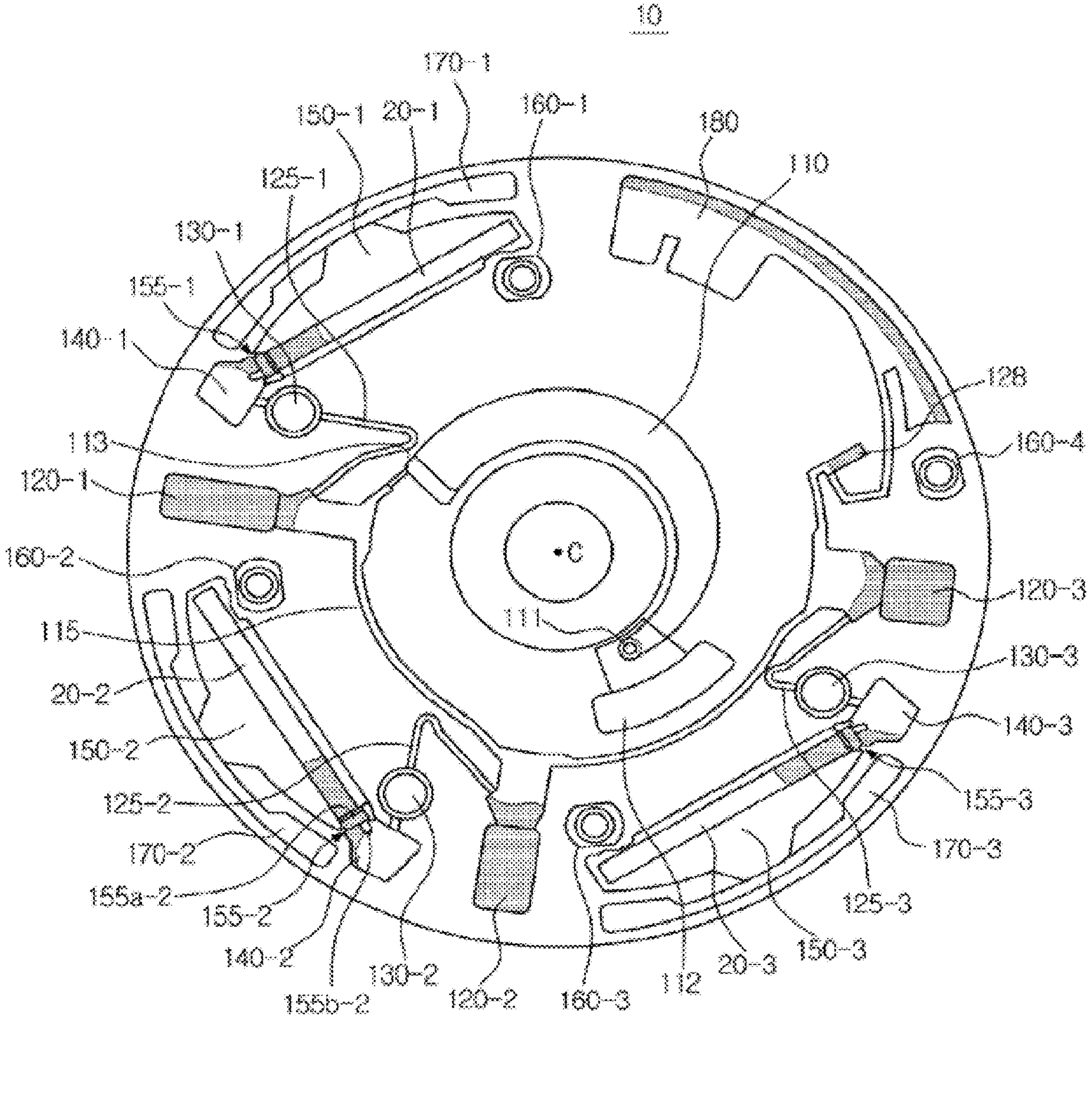
Figure 16D:
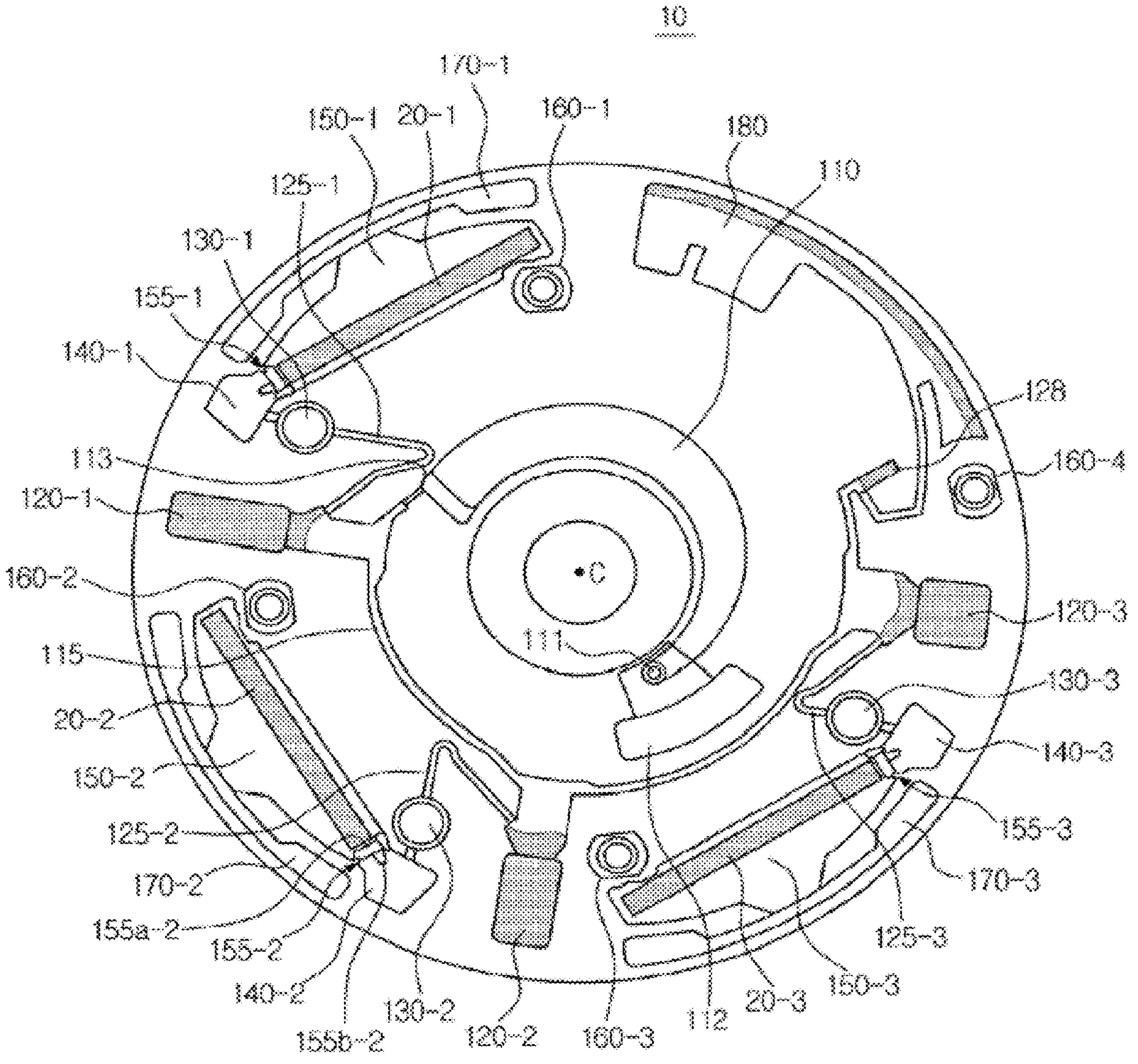
Figure 16E:
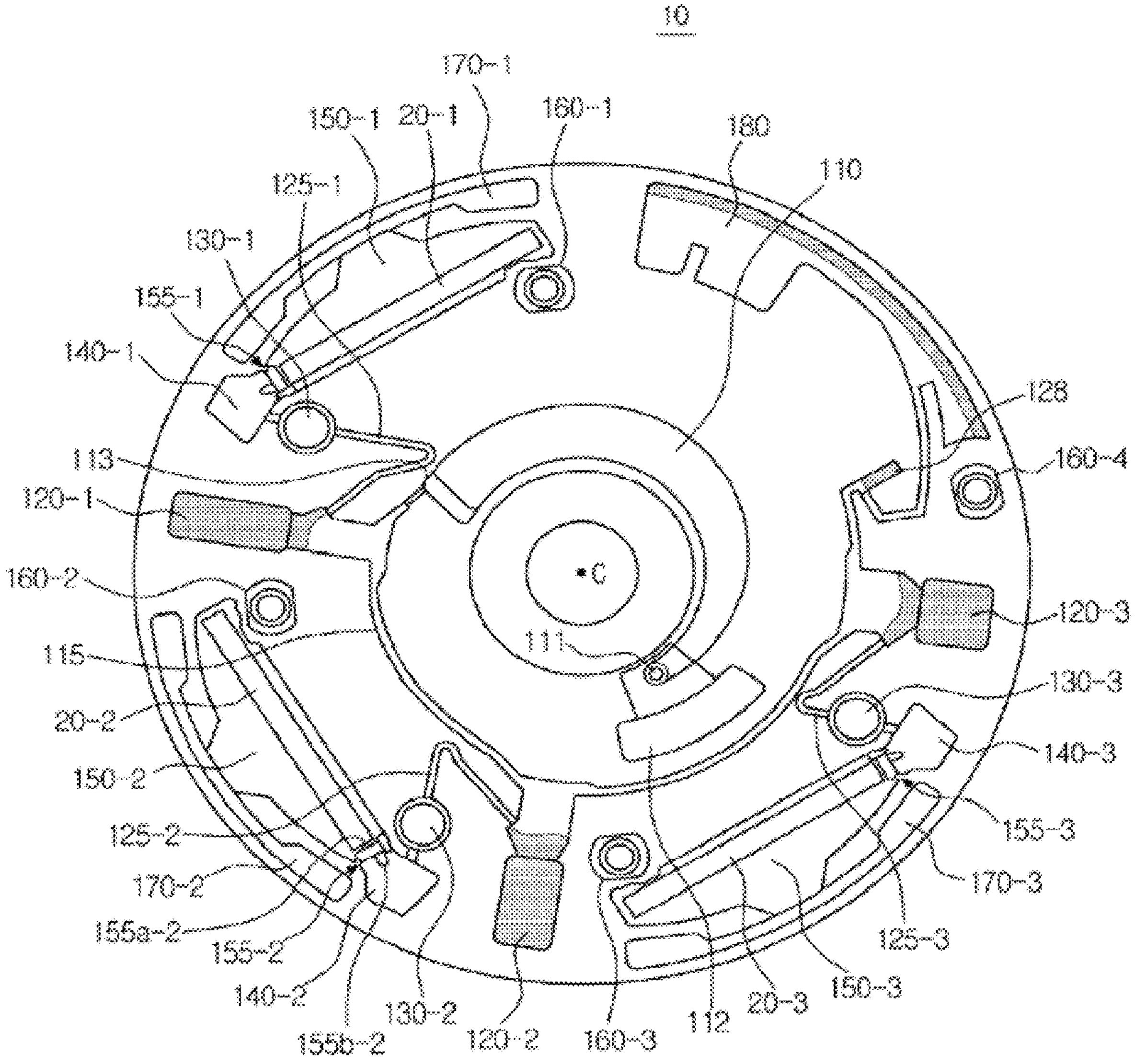
Figure 17:
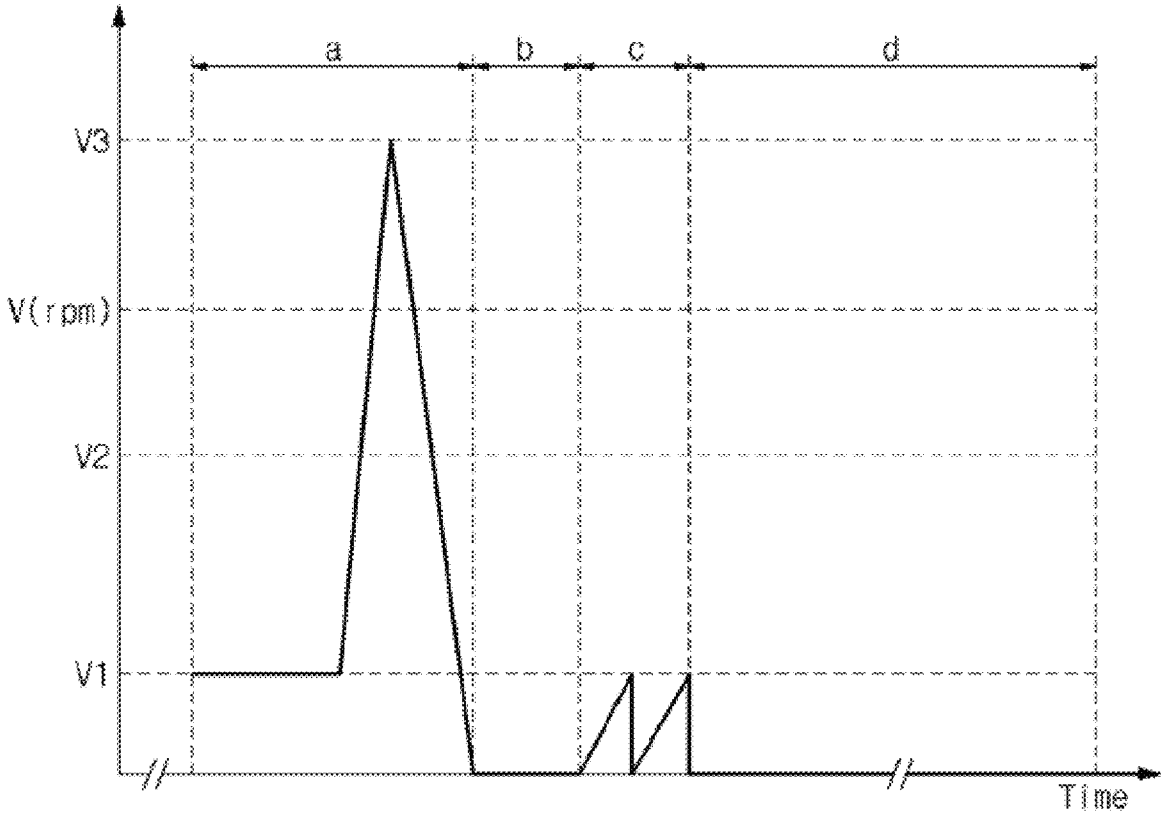
FIG. 17 is a graph schematically illustrating the rotational speed of the platform during respective fluid transfer operations of FIG. 16.

FIGS. 15A to 16E are plan views illustrating the flow of a fluid within the microfluidic device of FIG. 15, and FIG. 17 is a graph schematically illustrating the rotational speed of the platform during respective fluid transfer operations of FIGS. 16A to 16E. The rotational speed of the platform 100 may be controlled by the controller 320 of the test device 300 on which the platform 100 is mounted.

FIGS. 16A to 16E show respective fluid transfer operations performed after the fluid sample is transferred to the second chamber 130. The process from the operation of introducing the sample to the operation of transferring the sample to the second chamber 130 is the same as the process described above with reference to FIG. 14.

FIG. 16A is a plan view of the microfluidic device in the operation of transferring the sample from the second chamber 130 to the third chamber 140. The third chamber 140 is a metering chamber, and the previously described marker conjugate is assumed to be contained in the second chamber 130. Here, the marker conjugate may include only the first marker conjugate, or may include both the first marker conjugate and the second marker conjugate. When the marker conjugate includes only the first marker conjugate, the second marker conjugate is provided on the detection region 20 within the reaction chamber 150. When the marker conjugate includes both the first marker conjugate and the second conjugate, the detection region 20 may not be provided with the second marker conjugate.

When the platform 100 is rotated, the sample and the marker conjugate in the second chamber 130 move to the metering chamber 140. As shown in the interval (a) in FIG. 17, when sufficient centrifugal force is provided by increasing the rotational speed from v1 to v3, most of the marker conjugate remaining in the second chamber 130 moves to the metering chamber 140. The binding reaction between the first marker conjugate and the analyte in the sample may occur in the second chamber 130 (see FIG. 7) or in the metering chamber 140. In the illustrated embodiment, the binding reaction occurs in the metering chamber 140.

In the metering chamber 140, a first order reaction occurs between the sample and the first marker conjugate, i.e., between the analyte and the first marker conjugate. In addition, rotation of the platform 100 is stopped as shown in the interval (b) in FIG. 17. Thereby, the difference in concentration among positions of the reactant that has been created in the metering chamber 140 by the centrifugal force disappears.

FIG. 16B is a plan view of the microfluidic device in the operation of transferring the sample from the metering chamber 140 to the reaction chamber 150. When the first order reaction in the metering chamber 140 is completed within the time desired by the user, the reacted sample is supplied to the reaction chamber 150.

Referring to the interval (c) of FIG. 17, the rotational speed of the platform 100 may be controlled in a aw-shaped pattern to transfer the sample to the reaction chamber 150. The saw-shaped pattern of the rotational speed represents repeated intervals of increasing the rotational speed of the platform 100 and stopping. The saw-shaped control pattern of the rotational speed may be implemented by allowing the controller 320 of the test device 300 to directly control the rotational speed of the platform 100 as in the interval (c) of FIG. 17, or by using the magnetic module 330 and the magnetic body accommodating chamber 160. When the magnetic module 330 and the magnetic body accommodating chamber 160 are used to control the rotational speed of the platform 100, the saw-shaped control pattern of the rotational speed may be implemented by placing the magnetic module 330 at a position at which the magnetic module 330 does not influence the magnetic body accommodating chamber 160 at the early stage of rotation and thereafter, positioning the magnetic module 330 at a position under or over the magnetic body accommodating chamber 160 at a certain point of time while the rotational speed of the platform 100 is increasing.

In this case, the combination of the magnetic force of the magnetic body and inertial force resulting from rotation of the sample act simultaneously to rotate the platform 100, thereby driving the fluid sample toward the reaction chamber 150 as shown in FIG. 16B. The fluid guide 155*b* guides the driven fluid sample such that the fluid sample flows into the reaction chamber 150. The fluid passage 155*a* allows the fluid sample guided by the fluid guide 155*b* to enter the reaction chamber therethrough. The platform 100 is rotated in the direction heading from the metering chamber 140 to the reaction chamber 150, i.e., counterclockwise in the illustrated embodiment.

Therefore, the fluid sample positioned outside the point at which the metering chamber 140 and the reaction chamber 150 are connected to each other may be transferred to the reaction chamber 150 by control of the rotational speed as previously described. Thus, the occurrence of the second order reaction within the reaction chamber 150 at a desired time may be accomplished by adjustment of the control timing by the user, thereby supplying a desired amount of the fluid sample to the reaction chamber 150 with a small amount of torque applied to the platform 100. Here, the second order reaction is the chromatography reaction by the detection region 20.

FIG. 16C is a plan view of the microfluidic device which is in the initial state of the second order reaction in the reaction chamber 150. When the fluid sample passes through the fluid passage 155*a* and reaches the sample pad 22 of the detection region 20, the second order reaction begins as the fluid sample is moved by the capillary force. At the same time, the fluid sample remaining in the metering chamber 140 is also absorbed by the detection region 20. As shown in interval (d) of FIG. 17, the sample is moved by capillary force as the second order reaction begins, and therefore the rotation of the platform 100 may be stopped.

FIG. 16D is a plan view of the microfluidic device in which the second order reaction is completed in the reaction chamber. When the sample supplied to the reaction chamber 150 flows from the sample pad 22 of the detection region 20 and passes both the test line 24 and the control line 25, the second order reaction is completed. Although not shown in FIGS. 8 to 11, an absorption pad may be provided on the side opposite to the test line and the control line, so as to absorb the sample when the reactions are completed.

FIG. 16D is a plan view of the microfluidic device in the operation of drying the reaction chamber in which the second order reaction is completed. When the second order reaction is completed in the reaction chamber 150, the platform is rotated at a high speed to dry the detection region 20 and remove the remaining fluid sample.

If there is any fluid sample remaining in the first chamber 120, the siphon channels may be filled with the fluid sample by capillary force, and when the platform 100 is rotated at a high speed, the fluid sample filling the siphon channels 125 may pass through the second chambers 130, thereby flowing into the metering chambers 140. However, if the fluid sample in the metering chambers 140 flows into the reaction chamber 150, the detection region 20 indicating the result of the second order reaction may be contaminated. Accordingly, the microfluidic device 10 may further include a second siphon channel to transfer additional inflow of the fluid sample to the waste chamber 170.

Figure 18:
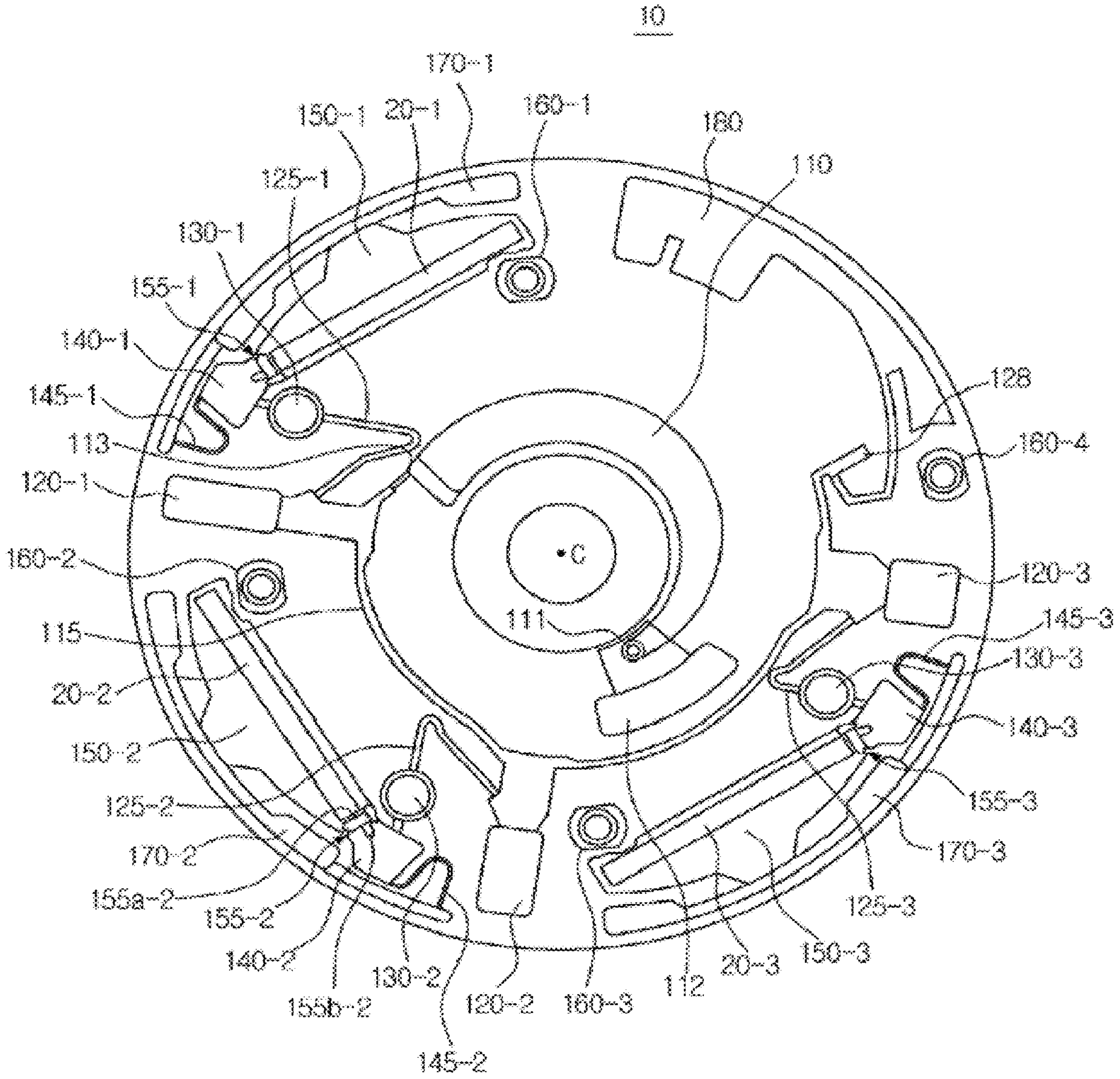
FIG. 18 is a plan view illustrating the microfluidic device further including a second siphon channel.

FIG. 18 is a plan view illustrating the microfluidic device further including a second siphon channel.

Referring to FIG. 18, the microfluidic device 10 described above with reference to FIG. 15 may further include an additional siphon channel 145 connecting the metering chamber 140 to the waste chamber 170. The added siphon channel 145 serves as the second siphon channel, and the siphon channel 125 connecting the first chamber 120 to the second chamber 130 serves as the first siphon channel. When the fluid sample remaining in the first chamber 120 flows into the metering chamber 140 during rotation of the platform 100 at high speed, it may in turn flow into the second siphon channel 145 connected to the lower portion of the metering chamber 140. The fluid sample is driven by capillary force to fill the second siphon channel 145, and the fluid sample filling the second siphon channel 145 is deposited into the waste chamber 170 by centrifugal force during the rotation of the platform 100.

Therefore, additional inflow of the fluid sample into the reaction chamber in which the reaction has been completed may be prevented even when there is remaining fluid sample in the first chamber.

As is apparent from the above description, a microfluidic structure and a microfluidic device having the same according to an exemplary embodiment allows for the efficient distribution of a fixed amount of a fluid to a plurality of chambers. Adjustment of the distribution speed and supply speed of the fluid, without a separate driving source, may thus be accomplished by arranging the chambers at different positions on the platform 100 and connecting them in parallel using a siphon channel.

Also, a multi-step reaction is allowed by connection of a first chamber (an accommodation chamber), a second chamber (a first order reaction chamber), a third chamber (a metering chamber) and a fourth chamber (a second order reaction chamber), and therefore reaction sensitivity is enhanced.

Further, contamination of a reaction result may be prevented by arranging a second siphon channel between the metering chamber and the waste chamber, and directing a fluid sample flowing to the reaction chamber to the waste chamber after completion of reaction.

Although a few exemplary embodiments have been shown and described, it would be appreciated by those skilled in the art that changes may be made in these embodiments without departing from the principles and spirit of the inventive concept, the scope of which is defined in the claims and their equivalents.

What is claimed is:

1. A test device, comprising:
- a microfluidic device including a platform having:
  - an accommodating chamber configured to accommodate a fluid;
  - a metering chamber configured to meter an amount of the fluid;
  - a reaction chamber configured to have a chromatographic reaction occur therein using the fluid metered in the metering chamber and introduced therein; and
  - a channel fluidly connecting the accommodating chamber, the metering chamber and the reaction chamber to each other; and
- a rotary drive unit configured to rotate the platform of the microfluidic device;
- a magnet module movable in a radial direction of the platform; and
- a controller to control the rotary drive unit and the magnet module,
- wherein the controller, upon transferring the fluid to the metering chamber, stops the platform such that a first order reaction occurs between the fluid and a marker conjugate accommodated in the metering chamber.

2. The test device according to claim 1, wherein the controller is configured to rotate the platform and transfer the fluid accommodated in the accommodating chamber to the metering chamber, and repeat intervals comprising increasing rotational speed of the platform and stopping rotation thereof, such that the fluid flows into the reaction chamber.

3. The test device according to claim 2, wherein the rotation is in a single direction.

4. The test device according to claim 1, wherein the controller, upon introduction of the fluid transferred to the metering chamber into the reaction chamber, stops the platform.

5. The test device according to claim 4, wherein when the platform is stopped, a detection region provided in the reaction chamber absorbs the fluid using a capillary force such that the fluid remaining in the metering chamber is transferred to the reaction chamber to undergo a chromatographic reaction in the reaction chamber.

6. The test device according to claim 5, wherein the controller, upon completion of the chromatographic reaction in the reaction chamber, rotates the platform to remove the fluid remaining in the reaction chamber.

7. A test device, comprising:

a microfluidic device including a platform having:

an accommodating chamber configured to accommodate a fluid;

a metering chamber configured to meter an amount of the fluid;

a reaction chamber configured to have a chromatographic reaction occur therein using the fluid metered in the metering chamber and introduced therein; and a channel fluidly connecting the accommodating chamber, the metering chamber and the reaction chamber to each other;

a rotary drive unit configured to rotate the platform of the microfluidic device;

a magnet module movable in a radial direction of the platform; and a controller to control the rotary drive unit and the magnet module, wherein the controller, upon transferring the fluid to the metering chamber, stops the platform such that a first order reaction occurs between the fluid and a marker conjugate accommodated in the metering chamber, and wherein the controller, upon introduction of the fluid transferred to the metering chamber into the reaction chamber, stops the platform.

8. The test device according to claim 7, wherein the controller is configured to rotate the platform and transfer the fluid accommodated in the accommodating chamber to the metering chamber, and repeat intervals comprising increasing rotational speed of the platform and stopping rotation thereof, such that the fluid flows into the reaction chamber.

9. The test device according to claim 8, wherein the rotation is in a single direction.

10. The test device according to claim 7, wherein when the platform is stopped, a detection region provided in the reaction chamber absorbs the fluid using a capillary force such that the fluid remaining in the metering chamber is transferred to the reaction chamber to undergo a chromatographic reaction in the reaction chamber.

11. The test device according to claim 10, wherein the controller, upon completion of the chromatographic reaction in the reaction chamber, rotates the platform to remove the fluid remaining in the reaction chamber.

12. The test device of claim 1, further comprising a detection unit arranged over the platform adjacent to a position facing the magnet module.

13. The test device of claim 12, wherein the detection unit comprises a light emitting unit and a light receiving unit.

14. The test device of claim 1, wherein the magnet module is initially positioned so as not to influence the rotation of the platform, and later transported to a position above or below the platform when a position identification operation is required.

15. The test device of claim 14, further comprising a magnetic body accommodated in a magnetic body accommodating chamber.

16. The test device of claim 15, wherein when the magnetic module is positioned above or below the platform, the magnet module attracts the magnetic body accommodated in the magnetic body accommodating chamber, thereby causing the platform to rotate by magnetic force such that the magnetic body accommodating chamber is aligned with the magnetic module.

17. The test device of claim 16, wherein information contained in the detection area is detected by the detection unit by forming the magnetic body accommodating chamber at a position adjacent to the detection object region within the platform.

18. The test device of claim 6, wherein upon completion of the chromatographic reaction in the reaction chamber the magnetic module is moved to a position above or below the platform, thereby causing the detection unit and the reaction chamber to be positioned facing each other.

19. The test device of claim 18, wherein the detection unit detects a result of the reaction in the reaction chamber by capturing an image of the reaction chamber.

20. The test device of claim 1, further comprising at least one additional accommodating chamber, at least one additional metering chamber, and at least one additional reaction chamber.

* * * * *